United States Patent
Irish et al.

(10) Patent No.: US 10,656,282 B2
(45) Date of Patent: May 19, 2020

(54) SYSTEM AND METHOD FOR LOCALIZATION AND TRACKING USING GNSS LOCATION ESTIMATES, SATELLITE SNR DATA AND 3D MAPS

(71) Applicant: The Regents of the University of California, Oakland, CA (US)

(72) Inventors: Andrew Irish, Mountain View, CA (US); Jason Isaacs, Camarillo, CA (US); Upamanyu Madhow, Santa Barbara, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 635 days.

(21) Appl. No.: 15/211,808

(22) Filed: Jul. 15, 2016

(65) Prior Publication Data

US 2017/0131409 A1   May 11, 2017

Related U.S. Application Data

(60) Provisional application No. 62/231,846, filed on Jul. 17, 2015, provisional application No. 62/282,939, filed on Aug. 17, 2015.

(51) Int. Cl.
    *G01S 19/22*      (2010.01)
    *G01S 19/42*      (2010.01)
(52) U.S. Cl.
    CPC .............. *G01S 19/22* (2013.01); *G01S 19/42* (2013.01); *G01S 19/428* (2013.01)
(58) Field of Classification Search
    CPC ......... G01S 19/22; G01S 19/428; G01S 19/42
    See application file for complete search history.

(56) References Cited

U.S. PATENT DOCUMENTS

| 4,949,268 A | * | 8/1990 | Nishikawa | ............. | G01C 21/28 340/995.1 |
| 6,900,758 B1 | | 5/2005 | Mann et al. | | |

(Continued)

FOREIGN PATENT DOCUMENTS

| WO | 2014150961 A1 | 9/2014 |
| WO | 2015126499 | 8/2015 |
| WO | 20150126499 A | 8/2015 |

OTHER PUBLICATIONS

"International Search Report and Written Opinion", PCT/US2014/068220, Aug. 21, 2015.

(Continued)

*Primary Examiner* — Cassi J Galt
(74) *Attorney, Agent, or Firm* — Michael A. Collins; Billion & Armitage

(57) ABSTRACT

A method of determining location of a user device includes receiving global navigation satellite system (GNSS) fix data that represents GNSS calculated position of the user device. The method further includes receiving signal strength data associated with each satellite communicating with the user device, and receiving map information regarding environment surrounding the user device. The received GNSS fix data and signal strength data is provided to a non-linear filter, wherein the non-linear filter fuses the GNSS fix data and signal strength data to generate an updated position estimate of the user device. In addition, the non-linear filter utilizes probabilistic shadow matching estimates that represent a likelihood of received signal strength data as a function of hypothesized user device locations within the environment described by the received map information.

11 Claims, 12 Drawing Sheets

(56) References Cited

U.S. PATENT DOCUMENTS

| | | |
|---|---|---|
| 2004/0190637 A1 | 9/2004 | Maltsev |
| 2005/0232338 A1 | 10/2005 | Ziedan |
| 2005/0234679 A1 | 10/2005 | Karlsson |
| 2006/0106533 A1 | 5/2006 | Hirokawa |
| 2008/0033645 A1 | 2/2008 | Levinson |
| 2008/0232434 A1 | 9/2008 | Yang |
| 2010/0194634 A1 | 8/2010 | Biacs |
| 2011/0102545 A1 | 5/2011 | Krishnaswamy et al. |
| 2011/0153198 A1 | 6/2011 | Kokkas |
| 2012/0035437 A1 | 2/2012 | Ferren |
| 2012/0044104 A1 | 2/2012 | Schloetzer |
| 2012/0159408 A1 | 6/2012 | Hershey et al. |
| 2012/0245844 A1 | 9/2012 | Lommel et al. |
| 2012/0249368 A1 | 10/2012 | Youssef et al. |
| 2012/0289243 A1 | 11/2012 | Tarlow et al. |
| 2013/0080045 A1 | 3/2013 | Ma et al. |
| 2013/0131985 A1 | 5/2013 | Weiland |
| 2013/0278466 A1 | 10/2013 | Owen |
| 2013/0285849 A1 | 10/2013 | Ben-Moshe et al. |
| 2013/0332065 A1 | 12/2013 | Hakim |
| 2014/0015529 A1 | 1/2014 | Bottomley |
| 2014/0062777 A1 | 3/2014 | MacGougan |
| 2015/0031390 A1 | 1/2015 | Robertson |
| 2015/0039154 A1 | 2/2015 | Bhardwaj |
| 2015/0086084 A1 | 3/2015 | Falconer |
| 2015/0309183 A1 | 10/2015 | Black |
| 2015/0319729 A1* | 11/2015 | MacGougan ......... H04W 4/023 455/456.1 |
| 2016/0062949 A1 | 3/2016 | Smith |
| 2016/0290805 A1 | 10/2016 | Irish et al. |

OTHER PUBLICATIONS

Abdi, et al., "A New Simple Model for Land Mobile Satellite Channels: First- and Second-Order Statistics", IEEE Transactions on Wireless Communications, vol. 2, No. 3, 519-528, May 2003.

Abdi, et al., "On the Estimation of the K Parameter for the Rice Fading Distribution", IEEE Communications Letters, vol. 5, No. 3, 92-94 Mar. 2001.

Arulampalam, et al., "A Tutorial on Particle Filters for Online Nonlinear/Non-Gaussian Bayesian Tracking", IEEE Transactions on Signal Processing, vol. 50, No. 2, 174-188, Feb. 2002.

Ben-Moshe, et al., "Improving Accuracy of GNSS Devices in Urban Canyons", CCCG 2011, Toronto ON, Aug. 10 [12, 2011.

Bryson, et al., Estimation using sampled data containing sequentially correlated noise. Journal of Spacecraft and Rockets, 5(6):662-665, 1968.

Groves, "Shadow Matching: A New GNSS Positioning Technique for Urban Canyons", The Journal of Navigation (2011), 64, 417-430.

Hsu, "NLOS Correction/Exclusion for GNSS Measurement Using RAIM and City Building Models", Sensors 2015, 15, Jul. 17, 2015, 17329-17349.

Ihler, et al., Efficient multiscale sampling from products of Gaussian mixtures. Advances in Neural Information Processing Systems, 16:1-8, 2004.

Isaacs, et al., "Bayesian Localization and Mapping Using GNSS SNR Measurements", Jul. 10, 2014, 445-451.

Kaplan, et al., Understanding GPS: Principles and Applications. Artech House, second edition, 2005, 322-329.

Kim, et al., Localization and 3D reconstruction of urban scenes using GPS. In Proc. of IEEE International Symposium on Wearable Computers., pp. 11-14, 2008.

Li, et al., Survey of maneuvering target tracking. part i. dynamic models. IEEE Trans. on Aerospace and Electronic Systems, 39(4): 1333-1364, 2003.

Loo, A statistical model for a land mobile satellite link. IEEE Trans. on Vehicular Technology, 34(3):122-127, 1985.

Petersen, et al., The matrix cookbook. Technical University of Denmark, 7:15, 2008.

Peyraud, et al., "About Non-Line-Of-Sight Satellite Detection and Exclusion in a 3D Map-Aided Localization Algorithm", Sensors 2013, 13, Jan. 11, 2013, 829-847.

L Wang, 'Kinematic GNSS Shadow Matching Using Particle Filters', In: Proceedings of the 27th International Technical Meeting of The Satellite Division of the Institute of Navigation (ION GNSS+ 2014), 2014, Tampa, Florida, pp. 1907-1919.

International Search Report and Written Opinion issued in PCT Application No. PCT/US2016/042588, dated Apr. 13, 2017, 15 pp.

Sequra, et al., "Ultra Wide-Band Localization and Slam: a Comparative Study for Mobile Robot Navigation", Sensors MDPI, Feb. 10, 2011, 2035-2055.

Irish, et al., "Belief Propagation Based Localization and Mapping Using Sparsely Sampled GNSS SNR Measurements", 2014 IEEE International Conference on Robotics and Automation (ICRA), 2014, IEEE, p. 1977-1982.

Klaas, et al., "Fast Particle Smoothing: If I Had a Million Particles", Proceedings of the 23rd International Conference on Machine Learning, 2006, Pittsburgh, PA, USA.

"EP Partial Search Report for 16852235.7-1206 / 3326005 PCT/ US2016042588, dated Feb. 13, 2019".

Issacs, et al., "Bayesian localization and mapping using GNSS SNR measurements", 2014 IEEE/ION Position, Location and Navigation Symposium—Plans 2014, IEEE,, May 5, 2014, 445-451.

Saunders, et al., "A physical-statistical model for land mobile satellite propagation in built-up areas", 10th International Conference on Antennas and Propagation, Conference Ppublication No. 436, IEE 1997, Apr. 14-17, 1997.

Yozevitch, et al., "A robust shadow m atching algorithm for GNSS Positioning", Navigation: Journal of the Institute of Navigation, Institute of Navigation, Fairfax, VA, US, vol. 62, No. 2, Jun. 1, 2015, 95-101.

Final Rejection Action for Application No. 15281997, dated Jan. 4, 2019.

Han, et al., "Kernel-Based Bayesian Filtering for Object Tracking", Proceedings 2005 IEEE Computer Society Conference on Computer Vision and Pattern Recognition, CVPR 2005:20-25, San Diego, CA, IEEE, Piscataway, NJ, USA, vol. 1, (Jun. 20, 2005), pp. 227-234, XP010817436, DOI: 10.1109/CVPR.2005.199, ISBN 978-0-7695-2372-9.

* cited by examiner

SYSTEM AND METHOD FOR LOCALIZATION AND TRACKING USING GNSS LOCATION ESTIMATES, SATELLITE SNR DATA AND 3D MAPS

CROSS-REFERENCE TO RELATED APPLICATIONS

This application claims priority to U.S. Provisional Application No. 62/231,846, filed on Jul. 17, 2015, 2015, and entitled "Robust localization and tracking using GBNSS location estimates, satellite SNR data and 3D maps" and U.S. Provisional Application No. 62/282,939, filed on Aug. 17, 2015, 2015, and entitled "Enhanced techniques for localization and tracking using GNSS location estimates, satellite SNR data and 3D maps" the disclosure of which is incorporated by reference in its entirety.

STATEMENT OF GOVERNMENT RIGHTS

This invention was made with Government support under Grant (or Award) No. W911NF-09-0001 awarded by the U.S. Army Research Office Agency. The Government has certain rights in this invention.

TECHNICAL FIELD

This invention relates generally to location estimation using global navigation satellite systems (GNSS), and in particular to location estimation within built-up environments.

BACKGROUND

Global Navigation Satellite Systems (GNSS) consist of constellations of satellites, wherein each satellite broadcasts signals containing information so that corresponding earth-based receivers that receive the signal can identify the satellite that generated the signal. Based on time of arrival measurements (alternatively expressed as pseudoranges by multiplying by the speed of light) for signals from at least 4 satellites, a GNSS receiver estimates its three-dimensional (3D) location and timing offset from the highly accurate clocks used by the satellites. This is a simple generalization of the concept of trilateration, and a key assumption is that the path from each satellite to the receiver is line of sight (LOS). However, GNSS localization quality is often degraded. This degradation is especially prevalent in urban areas, where the presence of tall buildings generates reflections of the received signals. Because the GNSS location estimate is based, at least in part, on how long it takes the signal to reach the device (i.e., so called "time of flight" measurements), reflections prove especially problematic in determining the GNSS position fix as the time-of-flight, and hence the pseudorange, will increase as a result of the reflection. These errors in pseudorange often lead to large errors in localization, for example, up to 50 meters in high-rise urban environments. Even if the LOS path is available, the pseudorange may be corrupted by the presence of additional reflected paths.

Inaccuracies in GNSS in urban environments have a significant adverse impact in a large, and growing, number of settings. In addition to its traditional applications in transportation logistics, the use of GNSS has become ubiquitous with the advent of consumer mobile electronic devices. GNSS-based localization is relied upon by individual users for both pedestrian and vehicular navigation. Accurate global localization using GNSS also forms the basis for a variety of enterprises such as car services and delivery services. It is also a critical component in vehicular automation technology, with global location using GNSS providing an anchor for fine-grained localization and tracking using vehicular sensors and actuators.

A GNSS receiver has information about the signal-to-noise ratio (SNR) of each satellite it sees, which can be often be obtained via a convenient software interface. These SNRs, employed together with information about the propagation environment, can provide valuable information about location that supplements the standard GNSS position fix. In GNSS and other wireless communication, line-of-sight (LOS) channels are characterized by statistically higher received power levels than those in which the LOS signal component is blocked (e.g., non-LOS or NLOS channels). As a mobile GNSS receiver traverses an area, obstacles (e.g., buildings, trees, terrain) frequently block the LOS component of different satellite signals, resulting in NLOS channels characterized by statistically lower signal-to-noise ratios (SNR). While the NLOS channels cannot be relied upon to determine the position fix of the user device, the decrease in SNR does provide information regarding the location of the device; namely, that the device is within the shadow of a building/infrastructure. Thus, the satellite SNRs yield probabilistic information regarding the receiver's location: higher SNR indicates that the path from the receiver to the satellite is likely LOS, while lower SNR indicates that the path from the receiver to the satellite is likely NLOS. Having knowledge of the layout/map of the urban environment, the satellite SNR signal can be utilized to determine possible locations for the user device based on calculation of positions that would likely be "blocked" or in the shadow of various buildings or structures. Such procedures for extracting location information from satellite SNRs is termed "shadow matching."

While shadow matching using satellite SNRs provides valuable location information that can improve the standard GNSS location estimate, the information from shadow matching is noisy, and inherently probabilistic. Specifically, high SNR could be obtained for NLOS paths due to strong reflections, while low SNR could be obtained for LOS paths due to multipath interference. Thus, deterministic shadow matching does not work in complex propagation environments.

It would therefore be beneficial to develop a robust, computationally efficient approach for utilizing shadow matching for localization and tracking, in a manner that accounts for modeling uncertainties and measurement noise.

DETAILED DESCRIPTION

Figure 1:
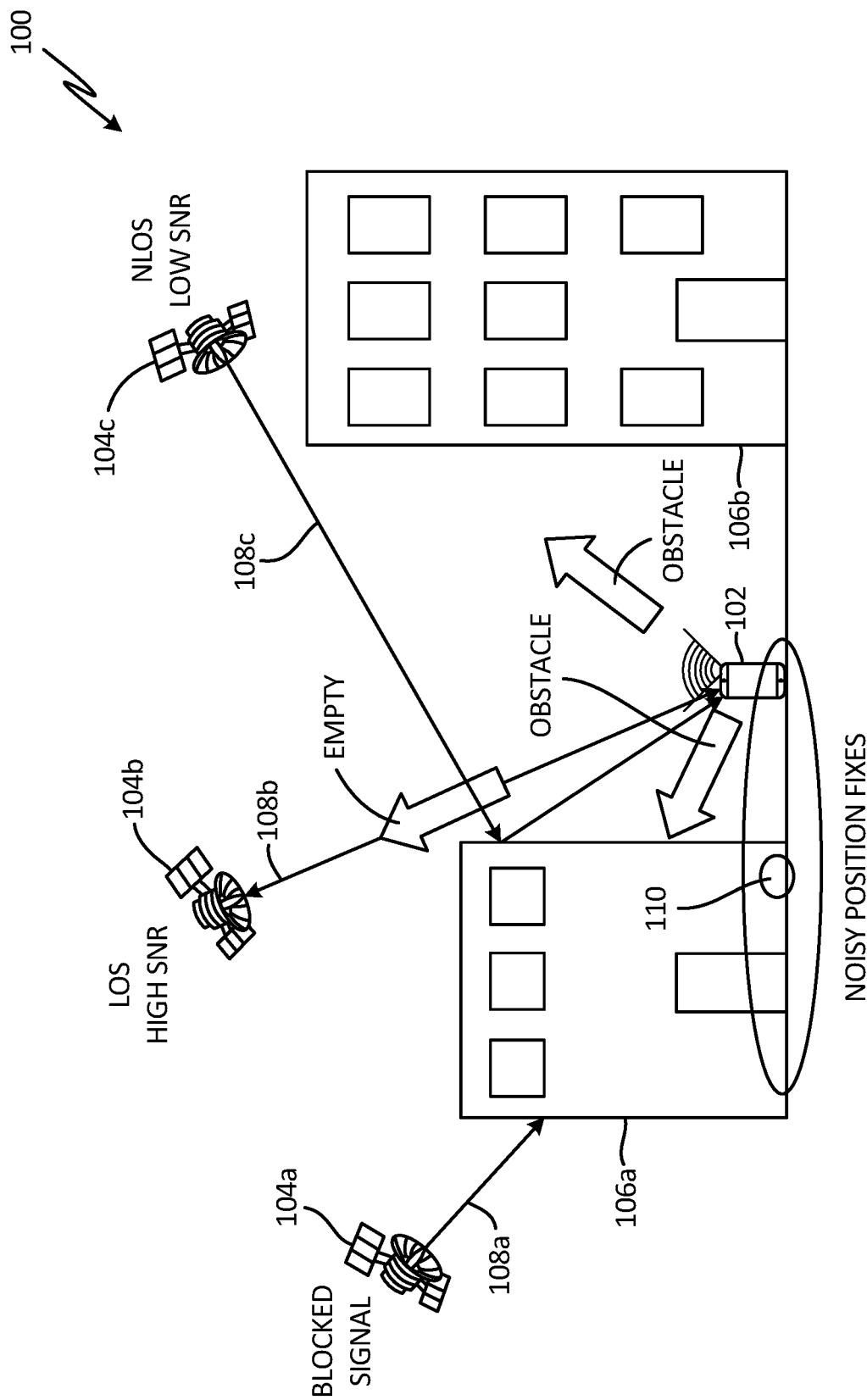
FIG. 1 is a schematic diagram of a localization and tracking system according to an embodiment of the present invention.

The present invention provides a system and method of improving position estimates of global navigation satellite systems (GNSS) using probabilistic shadow matching. The improvements are particularly significant in urban areas where GNSS position fixes could become inaccurate due to LOS blockage and multipath propagation.

The localization and tracking algorithms disclosed here employ the following information: the locations of the satellites, the GNSS receiver's location estimate and associated estimated uncertainty, the SNRs of the satellites, and information regarding the 3D environment surrounding the receiver. Information regarding the 3D environment, which can be provided in a number of ways, enables probabilistic shadow matching. Such information may be provided in terms of a 3D map, in which space is divided into volumetric pixels, or "voxels," and the probability of each voxel being occupied is specified. Alternatively, statistical information on building heights, together with 2D maps and road network data, can also provide the 3D information required for probabilistic shadow matching.

A Bayesian framework is employed to fuse the GNSS location fixes and satellite SNRs for localization and tracking. Specifically, the raw GNSS location estimates and the SNRs constitute the measurements driving a nonlinear filter. An important aspect of the solution is a simplification of the SNR measurement model for computational tractability.

The nonlinear filtering algorithms disclosed here fall under the general framework of particle filtering, where importance sampling is included in each filtering step. However, major modifications are required to handle the difficulties unique to the problem of urban localization.

In particular, the GNSS system describes a modified particle filter that provides a mechanism for selecting particles to include in the analysis set. Several different mechanisms are proposed, each with different benefits. For example, in one embodiment a measurement model employed by the GNSS system acts to increase uncertainty in the GNSS particle fix created by the measurement model based on the correlation between successive GNSS fix data. The increase in uncertainty prevents the GNSS fix from narrowing the particle set down to a specific area, and allows for the possibility that the GNSS fix is the result of a NLOS reflection that resulted in a bad position update. Increasing the uncertainty allows the region outside of this local maximum to be explored by the particle filter and therefore allows for the possibility that the correct position fix will be located. In another embodiment, the measurement model increases uncertainty based on how built up the environment is. In this way the present invention provides several solutions for allowing a particle filter to explore the space around the reported GNSS fix under the right circumstances to prevent the output estimate from becoming trapped in the wrong location.

In another embodiment, a modified particle filter is utilized that provides a mechanism for selecting particles (outside of the normal selection process) for inclusion in the particle set analyzed. Once again, this has the effect of allowing the particle filter to explore the 3D space surrounding the GNSS fix position, thus allowing the particle filter to avoid becoming captured in local maximums. A number of other features are described herein to provide and/or improve the functionality of GNSS localization and tracking, particularly in urban environment.

FIG. 1 is a schematic diagram of a localization and tracking system 100 according to an embodiment of the present invention. System 100 includes mobile device 102, satellites 104a, 104b, and 104c, and buildings/obstacles 106a and 106b. Typically many more than three satellites are utilized, and at least four, but for purposes of presenting the problem associated with generating a location estimate in an urban environment only three satellites are shown. In the embodiment shown in FIG. 1, mobile device 102 is a device capable of receiving GNSS data from one or more of the plurality of satellites. In addition, mobile device 102 is capable of measuring an attribute of the GNSS signal provided each of the plurality of satellites 104. For example, in one embodiment mobile device 102 monitors the signal-to-noise ratio (SNR) of the received GNSS data. Although a smartphone is the most commonly utilized device capable of interfacing with satellites 104 as part of a global navigation satellite system (GNSS), other types of mobile devices such as tablets, watches, etc. as well as specialized navigation units in automobiles, may be utilized.

In one embodiment, processing of the monitored GNSS data and SNR data is performed locally by mobile device 102. However, in other embodiments mobile device 102 communicates the received GNSS data and SNR data to a cloud-based localization server (shown in FIG. 2), which analyzes the data and returns a localization estimate to mobile device 102.

During normal operation (in a non-urban environment) the location of device 102 is determined based on the time-of-flight of signals received from multiple satellites. For example, if buildings 106a and 106b were not present, then the position of mobile device 102 could be triangulated based on the time of flight of signals 108a, 108b, and 108c, wherein time of flight is utilized to determine a distance of mobile device 102 from each of the plurality of satellites 104a, 104b, and 104c. FIG. 1 illustrates how the presence of buildings 106a and 106b may result in a noisy position estimate. In this particular example, signal 108a provided by satellite 104a is completely blocked by building 106a, and thus no information is obtained regarding the location of mobile device 102. For purposes of this discussion, signal 108a is described as a "blocked signal". Signal 108c provided by satellite 104c is not completely blocked, but the path between satellite 104c and mobile device 102 includes at least one reflection in this case a reflection off of building 106a. For purposes of this discussion, signal 108c is a "non-line-of-sight" (NLOS) signal. The reflection results in an increase in the time-of-flight of signal 108c as compared to a direct path between satellite 104 and mobile device 102, as well as a decrease in the signal-to-noise ratio (SNR) of signal 108c. Without taking into account the decrease in SNR, location estimates based on signal 108c will tend to overestimate the distance of mobile device 102 from satellite 104c. The result is an erroneous GNSS fix at point 110, located some distance to the left of the user's actual location.

Figure 2:
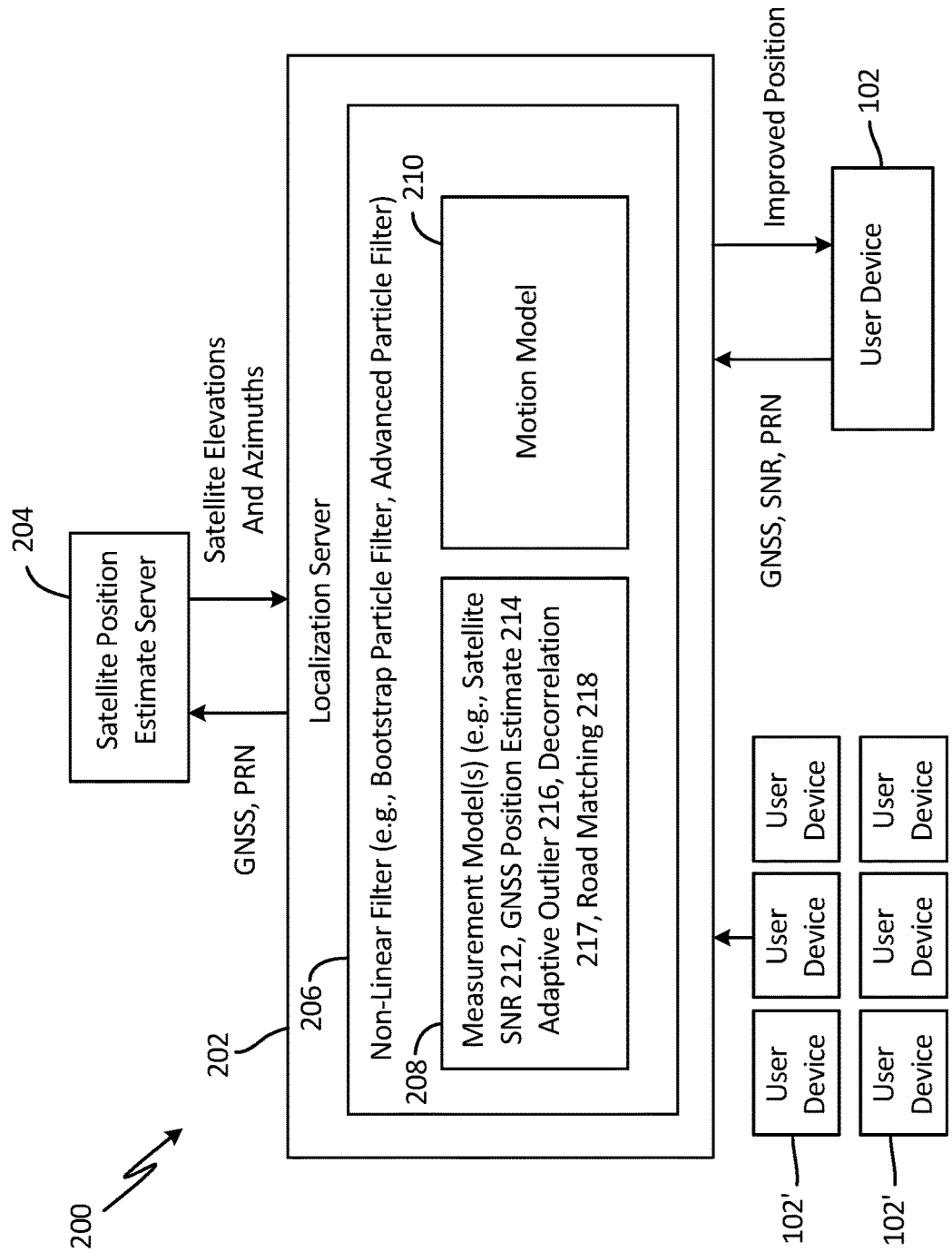
FIG. 2 is a block diagram of the localization and tracking system according to an embodiment of the present invention.

FIG. 2 is a block diagram of the localization and tracking system 200 according to an embodiment of the present invention. In the embodiment shown in FIG. 2, system 200 includes localization server 202, which in turn includes non-linear filter 206, measurement model(s) 208 and motion model 210, and satellite position estimate server 204. Location server 202 may include one or more processors and memory for implementing and storing non-linear filter 206 and associated models. In addition, while the embodiment shown in FIG. 2 processes information remotely from user device 102, in other embodiments the functions and analysis performed by localization server 202 may be implemented locally by user device 102.

In the embodiment shown in FIG. 2, user device 102 (along with other user devices 102') provide GNSS position data, measured signal-to-noise ratio (SNR) data for each satellite signal received, pseudo-random noise (PRN) code identifying each of the satellites communicating with a particular user device 102, and optionally the coordinates (azimuth and elevation) for each satellite signal received. The information provided by user device 102, including GNSS position data, SNR data, and PRN data, is available from most GNSS capable devices and therefore does not require any modifications to user device 102.

Localization server implements a non-linear filter (e.g., particle filter) 206 to fuse received measurement data, including GNSS position fix data and signal-to-noise ratio (SNR) data, to compute a conditional distribution of a user position. To do this, non-linear filter 206 utilizes motion model 210 to predict the movement of the target or user being tracked, and measurement model 208 to model how the current measurement is related to the current state. In one embodiment the motion model is expressed as $$x_t = f(x_{t-1}, u_t) \quad (1)$$

which maps the previous state $x_{t-1}$ (e.g., position, velocity of the target) and a control $u_t$ to the current state $x_t$. In one embodiment, $u_t$ is modeled as a complete unknown (i.e., modeled as zero mean noise) because no information regarding the intent of the target/user is available. In other embodiments, additional information may be available and $u_t$ may be modeled to reflect that information. In addition, the measurement model is expressed as $$[y_t, z_t] = g(x_t, v_t) \quad (2)$$

which maps the current state $x_t$ and random noise $v_t$ to the observed GNSS fix (i.e., position) $y_t$ and $N_t$ SNR measurements $z_t = [z_{t,1} \ldots, z_{t,N_t}]^T$.

Given measurement model 208 and motion model 210, non-linear filter 206 (e.g., modified particle filter) is utilized to determine the probability of a particular receiver state (i.e., position $x_t$) conditioned on all previous GNSS measurements $y_{1:t}$ and SNR measurements $z_{1:t}$ (i.e., posterior distribution) modeled as a set of K particles (representing hypothesized user device locations), expressed as follows:

$$p(x_t | y_{1:t}, z_{1:t}) = \sum_{k=1}^{K} w_t^{(k)} \delta_{x_t^{(k)}}(x_t) \quad (3)$$

wherein $w_t^{(k)}$ represents a weight and $x_t^{(k)}$ a state (position, velocity, etc.) associated with each of the plurality of K particles, wherein $\delta_a(b)$ is the Dirac measure (equals 1 if a=b and 0 otherwise), and wherein $y_{1:t}$, $z_{1:t}$ refer to all the measurements from time 1 (the time instant) to time instant t. While other types of non-linear filters may be utilized, the present invention utilizes a particle filter to handle the multi-modal distributions generated as a result of arbitrarily shaped satellite shadows. Particle filters are particularly adept at analyzing multi-modal distributions.

Motion Model

As discussed above, the motion model is utilized to predict possible locations of a user device being tracked. That is, given a plurality of possible locations in a previous time step, the motion model 210 predicts possible particle locations (representing potential user device locations) in the next time step given what knowledge is available regarding the user (i.e., intent, speed, direction).

In one embodiment the motion model is constructed to describe continuous horizontal (2D) motion within 3D space. For example, the state x of a pedestrian user can be described as $x = [r_x, \dot{r}_x, r_y, \dot{r}_y, r_z]$ wherein $r_e$ and $\dot{r}_e$ refer to position and velocity along axis e. In one embodiment, the above motion model 210 is utilized to represent the motion of pedestrians. In other embodiments the motion model may be modified to represent the movement of vehicles by including information regarding how vehicles are allowed to move, including constraints such as how quickly a vehicle is allowed to turn ω and whether the vehicle is allowed to leave the road. In addition, the motion model may be extended to track objects capable of moving through 3D space (e.g., drones, airplanes, people in buildings, etc.).

In one embodiment, the motion model 210 models the possible position coordinates as particles and non-position coordinates (e.g., velocity) as distributions (e.g., Gaussians) such that the motion model can be expressed as follows:

$$p(x_t | y_{1:t}, z_{1:t}) = \sum_{k=1}^{K} w_t^{(k)} N(x_t | x_t^{(k)}, A_t) \quad (4)$$

wherein the covariance A is singular (zeroes filling rows and columns) the position dimensions, and wherein N(·|m, C) represents a multivariate Gaussian distribution, with mean m and covariance matrix C. A baseline motion model is one with Gaussian dynamics:

$$x_t = \Phi_t x_{t-1} + u_t \quad (5)$$

wherein $\Phi_t$ is the state transition matrix and $u_t \sim N(0, Q_t)$ is the process noise. In one embodiment, times t and t−1 are separated by about one second. In addition, in one embodiment the pedestrian and vehicular models utilize a Nearly Constant Velocity (NCV) model. The framework is generally applicable to the form:

$$x_t = f(x_{t-1}) + u(x_{t-1}) \quad (6)$$

wherein $u(x_{t-1})$ is Gaussian.

Measurement Model

As discussed above, the measurement model 208 acts to map the current state $x_t$ and random noise $v_t$ to the observed GNSS position estimate $y_t$ and $N_t$ SNR measurements $z_t = [z_{t,1} \ldots, z_{t,N_t}]^T$. That is, the measurement model determines the probability of a particle being located at various locations given received measurement data (e.g., GNSS fix data, SNR). Therefore, the measurement model comprises several individual models to handle the GNSS position estimates received from user device 102 and SNR measurement received from user device 102. Each model is described is described in turn.

SNR Measurement Model

With respect to the received SNR measurements, the goal is to determine the likelihood of a particle being located at a particular position $x_t$ given the observed SNR measurement $z_t$ and what we know about the environment. In particular, SNR measurements provide information regarding whether a signal is line-of-sight (LOS) or non-line-of-sight (NLOS). In addition, if 3D information is available regarding the urban environment, along with satellite location data, the location of various particle locations can be analyzed to determine whether it is likely that the signal will be blocked. This combination of SNR measurement data that indicates whether or not a signal is blocked, and information regarding the probability of various locations being blocks allows determinations to be made regarding how likely it is for a user device to be located at a particular location. For example, an SNR measurement indicating a line-of-sight (LOS) signal provides information regarding the likely location of the user based on 3D knowledge of the environment. For particle locations $x_t$ determined to be in the "shadow" of a building (with respect to a particular satellite) the conditional probability of receiving a SNR measurement indicating a LOS path is fairly low. Conversely, for particle locations $x_t$ determined not to have any structures located between the user device and the satellite, the conditional probability of receiving a SNR measurement indicating a LOS path is fairly high. In this embodiment, a 3D map is included to allow determinations to be made regarding whether a user device is located in the "shadow" of a structure such as a building. However, as discussed in more detail below in other embodiments in which no 3D map is available a lightweight shadow matching technique may be utilized in which basic information regarding the height/density of buildings/structures within a region are utilized to estimate the conditional probability of a particle being located at a particular location given the measured SNR signal.

In at least one embodiment, however, SNR model 212 includes a 3D map m comprising an occupancy grid having a plurality of binary-valued "voxels" or "cells", wherein cell $m_i=1$ if the ith cell is occupied by something (e.g., building), and $m_i=0$ if the ith cell is unoccupied (e.g., empty space). In some embodiments, cells are not assigned a "hard" zero or one, but rather are associated an occupancy probability $o(m)=\{p(m_i=1)\}_i$, which is treated like measurement data. In this way, a 3D map is constructed that allows determinations to be made regarding the likelihood of a particle being located in the presence of a building (i.e., in the shadow).

SNR measurements for the nth satellite at time t is denoted by $z_{t,n}$, $n=1, \ldots, N_t$ where $N_t$ represents the number of satellites in view. In the embodiment shown in FIG. 2, user device 102 also provides PRN information that identifies the satellites for which SNR data is received. In this embodiment, PRN information provided to localization server 202 is provided to satellite position estimate server 204, which in response provides satellite elevation and azimuth data $[\theta_{t,n},\phi_{t,n}]$, which is considered noiseless. In other embodiments, user device 102 may provide satellite elevation and azimuth data $[\theta_{t,n},\phi_{t,n}]$ based on information received from the satellite, while in still other embodiments localization server 202 maintains this information locally. Based on a hypothesized location $x_t$ of a user (e.g., particle), a ray extending from this location to the satellite is determined to be line-of-sight (LOS) if only unoccupied cells are crossed. In contrast, if a ray passes through at least one occupied cell, it is classified as non-line-of-sight (NLOS).

While in some embodiments a threshold could be utilized to determine whether a measured SNR signal represents a LOS signal path or NLOS signal path, in this embodiment the probability of measured SNR signal representing a LOS path or NLOS path is expressed as separate distributions. For example, in one embodiment a LOS path is expressed as a Rician distribution, in which the distribution is centered around a relatively high SNR value and has a lower spread. Conversely, an NLOS path may be expressed as a log-normal distribution having a smaller mean and higher spread. For example, the Rician distribution can be expressed as:

$$f_{los}(r_{dB}) = \frac{\ln 10}{20} 10^{r_{dB}/20} f_{Rice}(10^{r_{dB}/20}) \qquad (7)$$

wherein $$f_{Rice}(r) = \frac{2(K_R+1)r}{\hat{\Omega}} \exp\left(-K_R - \frac{(K_R+1)r^2}{\hat{\Omega}}\right) \times I_0\left(2\sqrt{\frac{K_R(K_R+1)}{\hat{\Omega}}}\, r\right), \qquad (8)$$

$$r \geq 0$$

is the Rician fading density, $I_0(\bullet)$ is the $0^{th}$ order modified Bessel function of the first kind $\hat{\Omega}$ is the estimated total channel power, and $K_R$ is the Rician "K factor" (ratio of LOS to diffuse power). With respect to the NLOS log-normal fading model, in decibels it is simply described by a normal density with mean $\mu$ and variance $\tau^2$.

Assuming map m does not change, the SNR measurements can be modeled as conditionally independent given the map and poses, yielding the following factorization:

$$p(z \mid m, x) = \prod_{t,n} p(z_{t,n} \mid m, x_t) \qquad (9)$$

However, in reality the SNR of a given GNSS signal depends on a number of factors such as environmental parameters and satellite elevation, and a number of useful statistical models may be utilized to model these factors, such as Land to Mobile Satellite (LMS) channels of interests. However, a simplification of an inference algorithm is obtained using the following sensor model:

$$p(z_{t,n} \mid m, x_t^{(k)}) = \begin{cases} f_{los}(z_{t,n}), & m_i = 0 \quad \forall\, i \in \mathcal{M}(t,n,k) \\ f_{nlos}(z_{t,n}), & \text{otherwise} \end{cases} \qquad (10)$$

where $\mathcal{M}(t, n, k)$ contains the indices of cells intersected by the ray originating at particle $x_t^{(k)}$, in the direction of satellite n at time t.

When the map is probabilistic rather than deterministic, each individual SNR measurement is modeled as a binary mixture (rather than as true or false), wherein the satellite is either line-of-sight (LOS) with probability p or non line-of-sight (NLOS) with probability 1−p. In one embodiment, this is modeled as:

$$p(z_{t,n}\mid x_t^{(k)}, o(m)) = p f_{los}(z_{t,n}) + (1-p) f_{nlos}(z_{t,n}) \qquad (11)$$

where $f_{los}$ and $f_{nlos}$ are the LOS and NLOS likelihoods, respectively and $$p = \prod_{i \in M(t,n,k)} p(m_i = 0) \qquad (12)$$

That is, if one cell is identified as occupied then all cells associated with that particle-satellite ray trace are identified as occupied and do not required additional analysis of other cells/voxels. This provides a dramatic improvement in the computationally complexity, while providing very good performance. In another embodiment, additional improvements may be obtained by including in the LOS/NLOS distribution a dependence on satellite elevation, wherein satellites at higher elevations are presumed to provide a greater LOS likelihood.

In general, a log normal shadowing model is used for NLOS distributions and Nakagami or Rician multipath fading model is used for the LOS distribution. However, in other embodiments other models may be utilized, including composite multipath and shadow fading models such as Generalized-K for NLOS distributions. In another embodiment, the LOS model is provided as follows:

$$f_{los}(z_{t,n}) = (1-\beta)f_{los}^{now}(z_{t,n}) + \beta f_{los}^{noise}(z_{t,n}) \qquad (13)$$

where $f_{los}^{now}$ is the nominal (Rician or Nakagami) distribution and $f_{los}^{noise}$ is the noise distribution, which has been taken to be either uniform over the SNR dynamic range or the nominal NLOS distribution (sometimes referred to as the "confusion" or "swap" model).

In this way, SNR measurement model 212 provides a simplified method of calculating the (conditional) likelihood of a particular being located at a particular location $x_t$ given SNR measurements $z_t$ and occupancy map $o(m)$.

GNSS Position Estimate Model

Typically, the GNSS location fix is given as $y_t = Hx_t + e_t$, where the covariance of the error $e_t$ is estimated using standard Dilution of Precision computations, and where H is the measurement matrix which serves to capture only the position coordinates of the state. However, these computations assume that signals received by user device 102 are LOS, as opposed to strong reflections with the LOS path blocked. To account for the possibility of outliers generated as a result of strong reflections (signals having relatively high SNR values, despite a NLOS path), the GNSS position estimate model 214 is modified by modeling the GNSS position fix as a mixture of a reported Gaussian $\tilde{y} \sim N(x_t, C_t)$ (wherein the covariance is estimated using standard Dilution of Precision techniques) and an outlier vector $e_t$ which is derived from a broader multivariate distribution, such that $$y_t = (1-\alpha)\tilde{y} + \alpha e_t \qquad (14)$$

where $\alpha$ is the outlier probability. In one embodiment, the outlier probability $\alpha$ is coarsely adapted by scenario (i.e., adjusted based on the environment, with the value of $\alpha$ increasing for more built-up environments likely to generate more outlier conditions). In this way, the measurement model 208 is modified using an adaptive outlier model 216 to allow the GNSS position estimate to be given less weight when the user is located within an environment assigned a high value $\alpha$ (i.e., built-up environment) to account for the likely errors generated as a result of strong reflections.

In one embodiment, the GNSS position estimate model 214 may be further modified with respect to vehicle measurements (discussed in more detail with respect to FIG. 11, below) using road matching model 218, in general, because vehicles are confined (for the most part) to operate on streets, a pseudo measurement vector of possible street assignments that varies by particle location may be added. For example, in one embodiment a measurement vector is provided of possible street assignments that varies by particle location and is denoted $s_t^{(k)} = [S_{t,1}^{(k)}, \ldots, s_{t,Mt}^{(k)}]$ for the kth particle. Although not a measurement in the usual sense, this is referred to as the road matching prior and is utilized to further determine the likely position of a particle based on the assumption that a vehicle must be located on a street. In this embodiment, the measurement model 208 then becomes, in terms of likelihoods for particle $x_t^{(k)}$, $$p(y_t, z_t, s_t^{(k)} | x_t^{(k)}) = p(s_t^{(k)} | x_t^{(k)}) p(y_t | x_t^{(k)}) \prod_n p(z_{t,n} | x_t^{(k)}) \qquad (15)$$

where independence of the observations given the current state is assumed. However, the road matching prior is not factored into the product of its components. Instead, the conditional probability associated with each particle is selected based on a maximum over individual assignment likelihoods such that each particle is assigned a "best explanation".

$$p(s_t^{(k)} | x_t^{(k)}) = \max\{\max_i p(s_{t,i}^{(k)} | x_t^{(k)}), \epsilon\} \qquad (16)$$

In other embodiments, rather than utilize a maximum value, the values may be summed to determine the most likely location. However, one potential drawback of this arrangement is that more than one street assignment may be assigned when the vehicle is located at an intersection. In another embodiment, a minimum likelihood value e is also included in the vehicle motion model to prevent the road matching element $s_1^{(k)}$ from becoming too influential as compared with other measurements. In still other embodiments, rather than classify a vehicle as located on a particular street or not, determinations are made regarding the particular lane on which the vehicle is located.

Overall Measurement Model

The SNR measurement model 212 and GNSS position estimate model 214 can be expressed as an overall measurement model, which is non-linear and non-Gaussian, Simultaneous measurements of GNSS data and SNR data are assumed to be conditionally independent given the receiver state:

$$p(y_t, z_t | x_t) = p(y_t, z_t | x_t, o(m)) = p(y_t | x_t) \prod_n p(z_{t,n} | x_t, o(m)) \qquad (17)$$

for which is introduced a dependence on the map occupancy probabilities $o(m) = \{p(m_i=1)\}$, which as discussed above is treated as measurement data. It should be noted that this is not strictly an accurate model. For example, because the map is actually unknown $p(z_t | x_t, o(m))$ does not factor as $p(z_t | x_t, m)$ would. However, as a result of the binary SNR measurement model (i.e., any occupied cell counts as all cells occupied), the SNR measurement can be evaluated as follows:

$$p(z_t \mid x_t) = \sum_m p(z_t, m \mid x_t) = \sum_m p(z_t \mid x_t, m)p(m) \qquad (18)$$

wherein $p(z_t|x_t, o(m))$ provides a good approximation. In addition, it is worth noting that successive are correlated, chiefly due to time correlated satellite pseudo-ranges errors and because the measurements are generally the output of a device navigation filter.

The Non-Linear Filter

Various types of non-linear filters 206 may be utilized to determine location based on the received GNSS data, SNR data and respective measurement models 208 and motion models 210. However, because the measurement model 208 is non-linear and non-Gaussian, a type of non-linear filter known as a particle filter (PF) may be utilized in embodiments of the present invention. In general, a PF operates by generating a posterior distribution of the state by putting weights at a set of hypothesized state values, or particles. The particles are propagated probabilistically to obtain a new set of particles and weights at time t−1, based on the dynamics of the motion model 210, and the new set of measurements (e.g., GNSS, SNR measurements). As described in more detail with respect to FIGS. 3 and 4, embodiments of the present invention may make use of several different types of particle filters such as a modified bootstrap particle filter and a more advanced particle filter. While the bootstrap PF is simple to implement, one disadvantage is that it does not utilize the latest measurements to predict possible particle locations. Rather, particles are drawn from the motion model, which can result in particles being trapped in local maxima of the posterior distribution. The advanced PF overcomes these shortcoming by sampling from distributions that take into account the most current measurements, and may include a particle reset function in which particles are sampled from a likelihood surface rather than being confined to the results of the motion model. As a result, the advanced PF is able to explore the 3D (or 2D) space outside of the confines of the motion model 210, which helps avoid trapping of particle locations in local maxima, thereby yielding significant system robustness.

Figure 3:
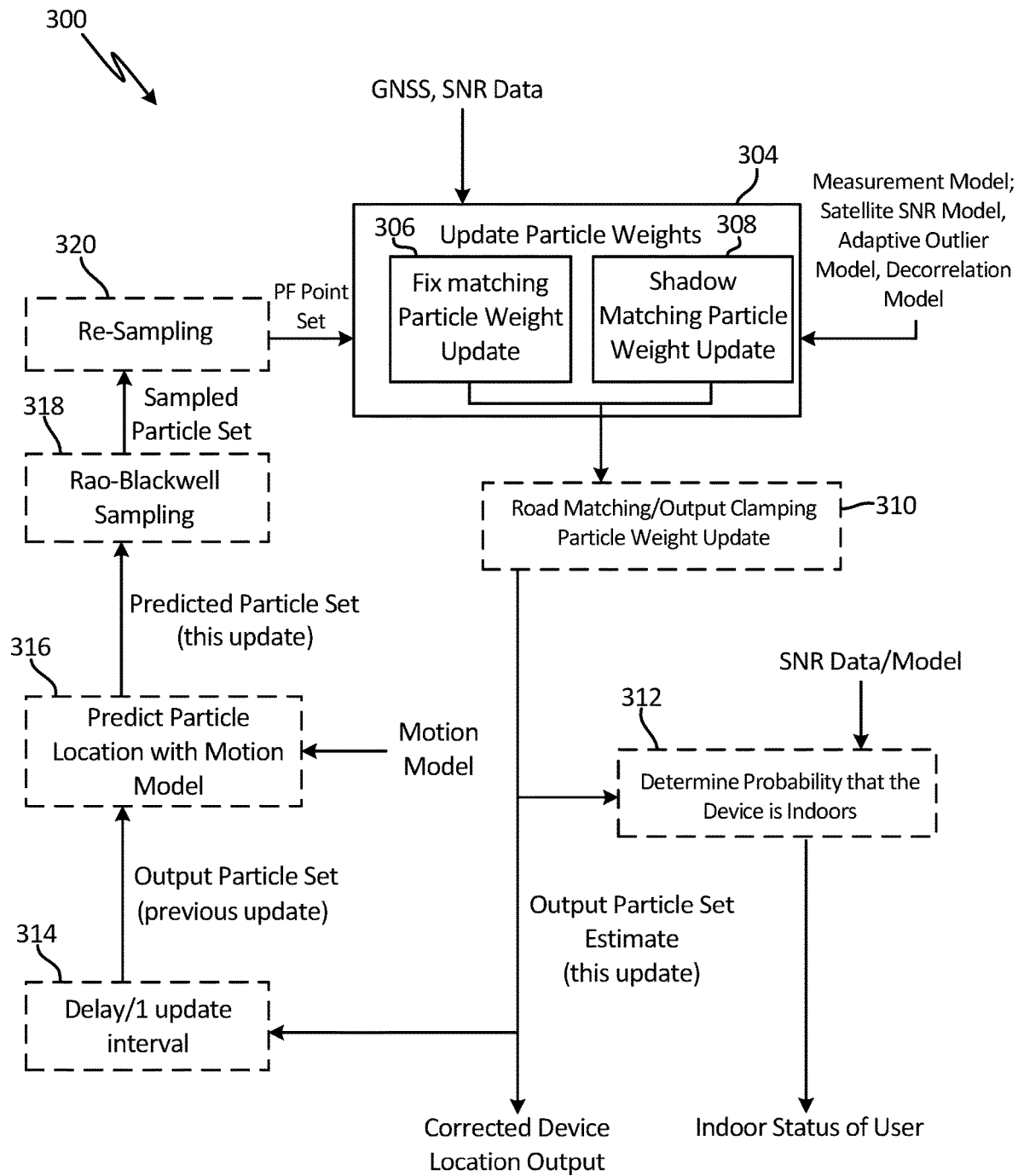
FIG. 3 is a flowchart that illustrates steps performed by the localization server using a bootstrap particle filter according to an embodiment of the present invention.

FIG. 3 is a flowchart that illustrates a method 300 of determining user position according to an embodiment of the present invention that utilizes the bootstrap particle filter (PF). Steps that are optional are illustrated using dashed boxes. However, the use of dashed boxes for optional steps does not imply that boxes illustrated in solid lines are necessarily required in each embodiment. In general, method 300 provides a probabilistic framework for determining/improving the location estimate generated by the user device that accounts for both modeling uncertainties and measurement noise. Inputs provided to method 300 include GNSS data and SNR data provided by the user device, wherein SNR data is provided with respect to each satellite with which the device is communicating.

Prior to a first iteration, a particle set is initialized based on the received GNSS and SNR data. In one embodiment, initialization includes sampling particles from an arbitrary distribution q(•) centered on the position provided by the GNSS data. Afterwards, the each particle location x is weighted by the ratio p(x)/q(x), where p(•) represents an evaluation of the measurement model using the initial measurement data. In subsequent iterations, the sample set of particles (i.e. PF Point set) is provided by the motion model.

For purposes of this discussion, it is assumed that at least one iteration has already been performed. An output particle set is generated that includes a plurality of weighted particles, each weighted particle representing a potential location of the user device, when the magnitude of the weight indicates the likelihood (with heavier weights indicating a higher likelihood than lower weights). A motion model is utilized at step 316 (described in more detail below) to predict the location of the particles in the next time-step, which results in generation of particle position distributions and velocity distributions representing possible position/velocity estimates for each particle. At step 318, some form of sampling is provided (e.g., Rao-Blackwell sampling) to reduce particle position distributions to a point for subsequent analysis by shadow matching techniques. The sampled particle set is then provided to step 304 to update particle weights via fix matching and shadow matching techniques.

At step 304 measurement models are utilized to update particle weights associated with a provided PF particle set based on newly received measurement data (GNSS fix data and SNR data) and various models.

In particular, at step 306 the received GNSS fix data is compared to the plurality of proposed particles included in the PF particle set. Weights are then assigned to those particles based on how likely they are in view of the new GNSS data. This step is referred to as fix matching because it relies on the most recently acquired GNSS fix or position information. However, as discussed above the presence of strong reflections may be prevalent in built-up environments and may distort the received GNSS data. To mitigate the effect of reflections in distorting the GNSS fix data, an adaptive outlier model described with respect to equation 14, above, may be utilized wherein the outlier probability α is coarsely adapted based on the environment (i.e., adjusted based on the environment, with the value of α increasing for more built-up environments likely to generate more outlier conditions). In this way, the GNSS position estimate can be given less weight when the user is located within an environment assigned a high value of a (i.e., built-up environment) to account for the likely errors generated as a result of strong reflections. As a result, the weights generated by other measurements models such as the SNR measurement model have greater influence.

In addition to problems of strong reflections, GNSS fixes sometimes exhibit an attractor or correlation problem. In particular, in response to a user remaining stationary for a period of time few seconds), and because the GNSS measurements are assumed to be independent identically distributed (iid) Gaussian, the PF filter can be attracted or drawn towards the erroneous—and stationary—GNSS estimate, even when inconsistent with the shadow matching SNR estimates. In one embodiment, step 306 further utilizes a decorrelation model that de-emphasizes particle weights deduced from noisy GNSS data as discussed in more detail with respect to FIGS. 6 and 7, below. In general, successive fixes which overlap more are determined to be more correlated. By estimating the overlap parameter $o_t \in [0, 1]$ at each time t, the GNSS position estimate model can be re-written to incorporate a de-correlation model $$y_t = Hx_t + (1-o_t)e_t + o_t n_t \qquad (19)$$

where $n_t$ is a very broad, elliptically bounded uniform density centered at zero. As the overlap $o_t \to p(y_t|x_t)$=constant in a large region, and successive fixes do not impact particles in this region, effectively mitigating successive GNSS updates. Conversely as $o_t \to 0$ the original fix density is recovered which allows the GNSS position estimate to take advantage of the new information. In this way, fix matching particle weight updates provided at step 306 may make use of one or more models, such as the adaptive outlier model an decorrelation model to improve the quality of the particle weights assigned.

At step 308, particle weights are similarly updated based on the received SNR measurements. As described above with respect to the SNR measurement model, shadow matching provides a mechanism for further identifying how likely it is a user device 102 is located at a particular particle position based on the SNR measurements $z_t$ monitored by the user device with respect to the plurality of available satellites. In addition, as discussed in more detail with respect to FIGS. 8 and 9 below, various shadow matching techniques—including a lightweight shadow matching technique—may be utilized to update particle weights based on the received SNR data. In particular, a benefit of utilizing the lightweight shadow matching technique described in more detail with respect to FIG. 9 is that it does not require complex or complete 3D maps of the urban environment and is computationally less expensive while still providing good overall performance.

The particle weight updates generated by fix matching and shadow matching as part of step 304 can be expressed as $$w_t^{(k)} \propto w_{t-1}^{(k)} p(z_t, y_t | x_t^{(k)}) \tag{20}$$

which illustrates that the updated weight is a function of the previous weight and the probability of the user device being located at particle $x_t^{(k)}$ given the most recent SNR measurement $z_t$ and position fix measurement $y_t$. Although made explicit, the order in which particle weight updates are made at step 304 (i.e., calculation of fix matching particle weights first, or shadow matching particle weights) is unimportant, as the resulting weights are multiplied with one another to generated the combined particle weight updates. In addition, in one embodiment particle weight updates are only calculated in response to updated or current measurement data. For example, if updated GNSS data is received, but no updated SNR data is received, then particle weights may be updated based only on the fix matching particle weight update, with the shadow matching particle weight update skipped until updated SNR data becomes available, and vice versa. In this embodiment, particle weight updates reflect receiving updated or new measurement data.

The output of the particle weight update provided at step 304 is a nominal output particle set, which can be utilized to determine a point estimate identifying the estimated location of user device 102 based on a minimum mean square error (MMSE) defined as:

$$\hat{x}_t = E(x_t) = \sum_k w_t^{(k)} x_t^{(k)} \tag{21}$$

In addition, the uncertainty associated with the estimate location is defined as the radius around $\hat{x}_t$ that captures 68% of the particle mass. In some embodiments this is the output provided to the user device to improve localization of the user device. In other embodiments additional operations may be performed on the nominal output particle set generated at step 304. For example, in one embodiment the nominal output particle set is further analyzed using a road matching particle weight update at step 310. The road matching model adds as an additional measurement vector to the measurement model possible street assignments that vary by particle location. In some ways, road matching provided at step 310 is functionally similar to any other measurement and can be inserted directly into the PP alongside the fix matching particle weight update and/shadow matching particle weight update. However, in the embodiment shown in FIG. 3 the implementation is simplified by operating the normal PF update, and then performing a road matching update on the nominal output particle set. The likelihood that a vehicle is driving down a particular street is a function of its proximity to that street. The position likelihood can then-fore be defined as a function of the distance to the street centerline $l(s_{t,i}^{(k)})$.

$$f_{pos}(s_{t,i}^{(k)} | r_t^{(k)}) = f\left(\frac{\|r_t^{(k)} - l(s_{t,i}^{(k)})\|}{\lambda(s_{t,i}^{(k)})}\right) \tag{22}$$

wherein $\lambda()$ maps to the street width.

In this embodiment, the weights targeting the posterior distribution at time t are, for particle k, given by $$w_t^{(k)} \ge \tilde{w}_t^{(k)} p(s_t^{(k)} | x_t^{(k)}) \tag{23}$$

where $\tilde{w}_t^{(k)}$ is then weight after applying the non-road matching PF update. The weights are then as usual) normalized to sum to one.

Figure 11:
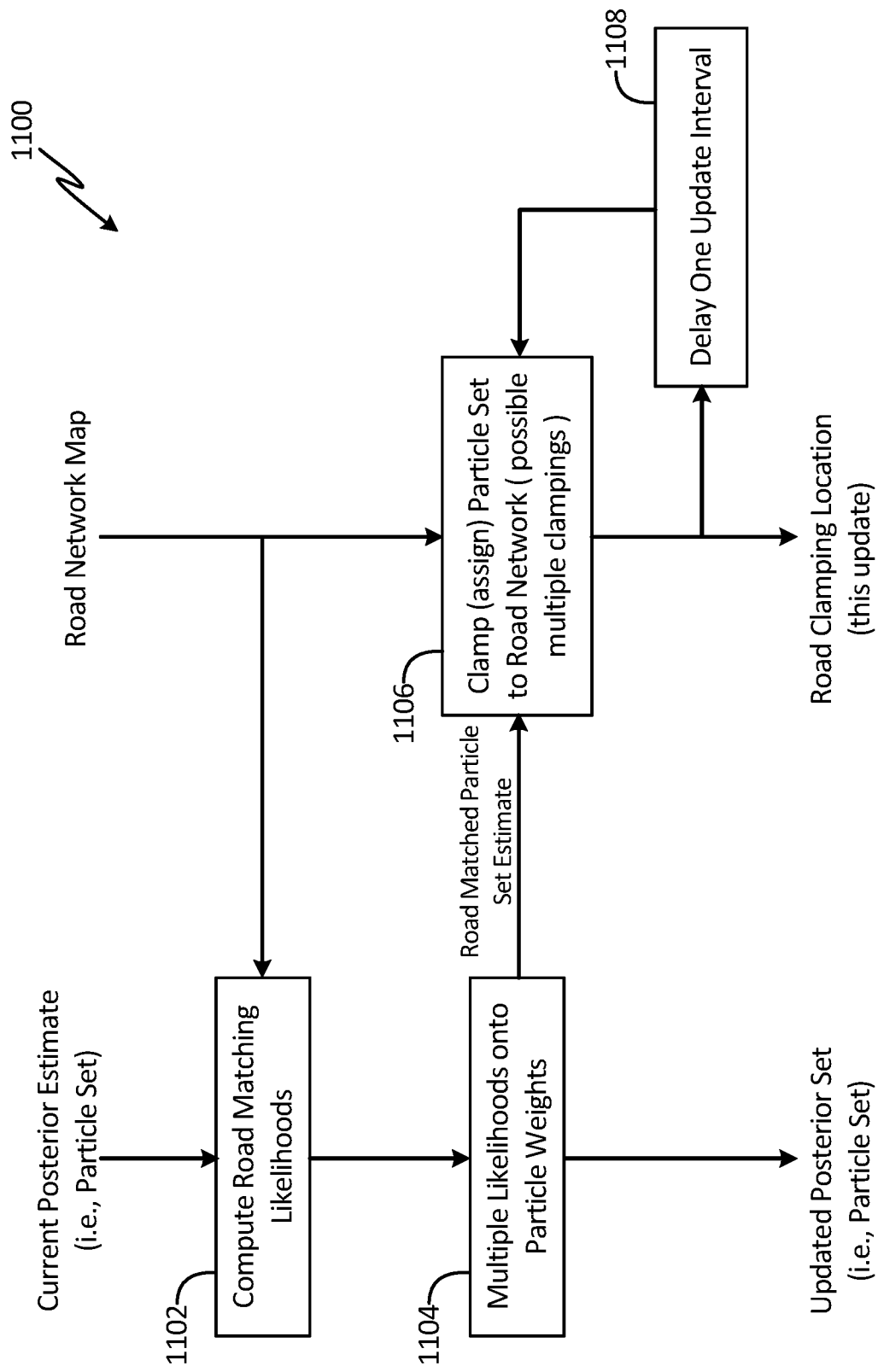
FIG. 11 is a flowchart that illustrates steps performed by the localization server to implement road matching/clamping according to an embodiment of the present invention.

As described in more detail with respect to FIG. 11, in one embodiment the road matching provided at step 310 further utilizes output clamping to prevent GPS fixes from providing an output that jumps between different streets or otherwise undermines confidence in the position estimate/fix.

In addition, at step 312 the nominal output particle set (updated at step 304 as part of the updating of particle weights or additionally at step 310 as part of the road matching) is utilized to determine whether the user is located indoors. The determination of whether the user device is located indoors is based on review of the SNR measurements to determine the probability that all SNR measurements are NLOS. If all satellites are determined to be NLOS, this is indicative that the user has moved indoors and an appropriate output can be generated. Determining whether a user device is located indoors, or is transitioning from indoors to outdoors or vice versa, is described in more detail with respect to FIG. 12, below.

As described briefly above, steps 314-320 describe how particles included in the output particle set estimate (i.e., current update) are propagated in time to generate a predicted particle set, which is sampled to provide an PF point set that is provided in feedback to aid in the updating of the particle weights at step 304.

In particular, at step 314 the output particle set estimate is delayed for a length of time corresponding with the update interval (e.g., 1 second, 10 seconds, etc.). Following the delay at step 314, the output particle set estimate identified as corresponding to the present or current update is now designated as corresponding to the previous update.

At step 316, the motion model is utilized to predict particle locations based on the output particle set. As described above with respect to equations (4)-(6), the motion model generates a predicted particle set representative of this update (i.e., current update). In the bootstrap PF, the predicted particle set for the kth particle, $q(x_t | x_{t-1}^{(k)})$ is taken to be the motion predicted distribution, which for the nominal linear Gaussian model leads to $$x_t^{(k)} \sim q(x_t | x_{t-1}^{(k)}) = p(x_t | x_{t-1}^{(k)}) = N(x_t | \Phi_t x_{t-1}^{(k)}, \Phi_t \Lambda_{t-1} \Phi_t^T + Q_t) \tag{24}$$

At step 318, the predicted particle set is sampled using Rao-Blackwell sampling to select a sampled particle set from the motion predicted distribution. In particular, the motion model generates with respect to each particle location a distribution of possible locations predicted in the future time step, along with a distribution of possible velocities. The Rao-Blackwell sampling provides a mechanism for restricting the motion predicted distribution generated at step 316 to a point mass that can be utilized as an input to the shadow matching particle weight update at step 308. One of the benefits of utilizing the Rao-Blackwell sampling is that it is a linear calculation (along with motion model utilized to predict particle locations). The Rao-Blackwell sampling does not sample velocity distributions, but rather allows predicted velocity distributions created by the motion model to be updated using standard conditional Gaussian equations. In other embodiments, other sampling techniques may be utilized to select point masses from the motion predicted distributions Optionally, at step 320, the particles are re-sampled as necessary to avoid particle collapse. In general, particle re-sampling at step 320 allows low weight particles (i.e., particles with a very low probability of representing a possible user location) to be removed from the particle set to prevent subsequent analysis of these particles. Depending on a confidence associated with generated models, particle re-sampling at step 320 does not need to be performed at every iteration, and for highly confident models may be performed somewhat infrequently. In one embodiment re-sampling at step 320 is optionally performed if the effective sample size $$\hat{K}_t = \left(\sum_k (w_t^{(k)})^2\right)^{-1} \quad (25)$$

is below a threshold. The resulting PF point set provided to step 304 to be updated based on the most recently received measurement data (GNSS fix, SNR).

Figure 4:
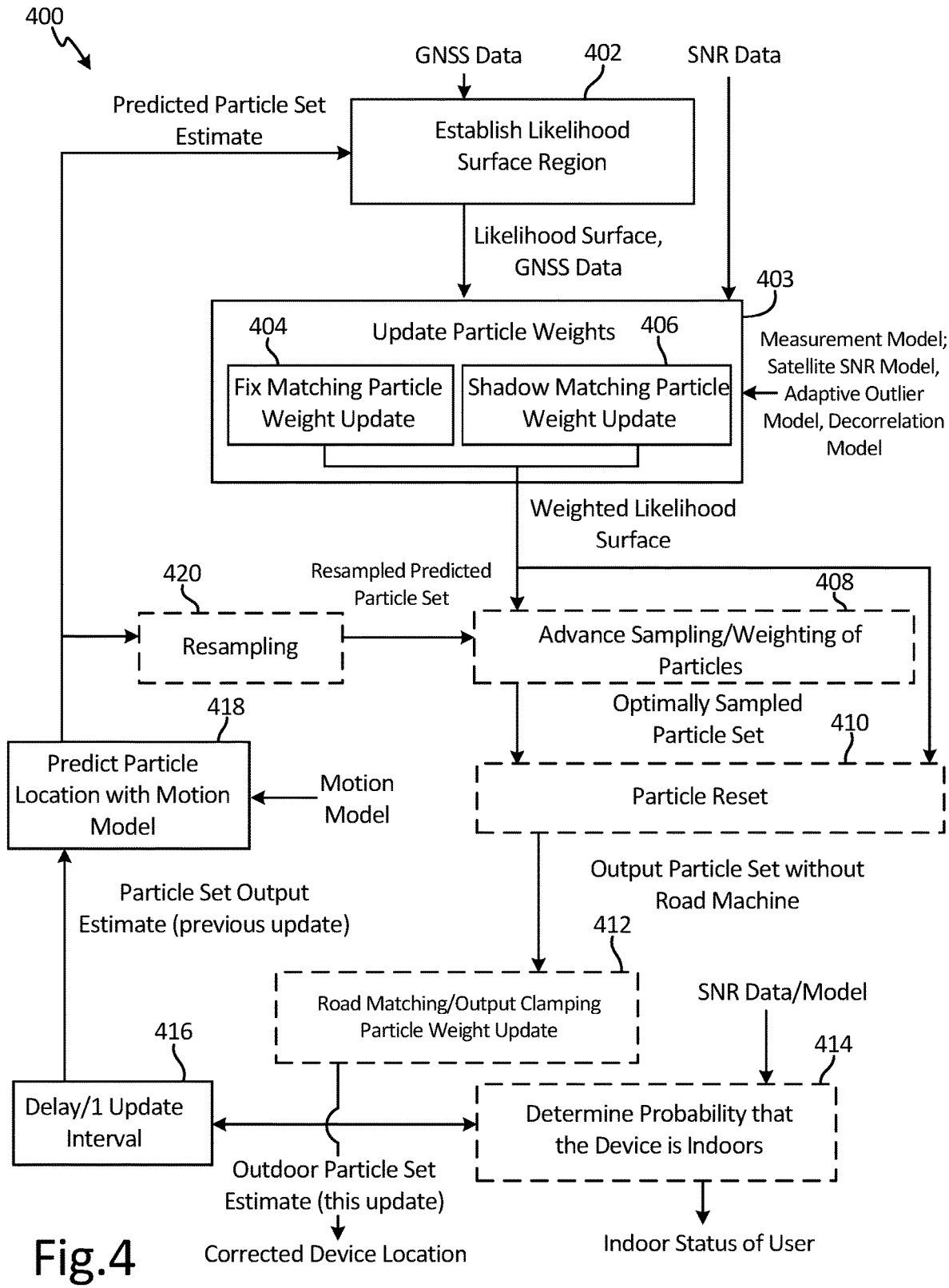
FIG. 4 is a flowchart that illustrates steps performed by the localization server using an advanced particle filter according to an embodiment of the present invention.

FIG. 4 is a flowchart that illustrates a method 400 of determining user position according to an embodiment of the present invention that utilizes an advanced particle filter (PF). Steps that are optional are once again illustrated using dashed boxes. However, the use of dashed boxes for optional steps does not imply that boxes illustrated in solid lines are required. In general, method 400 provides a probabilistic framework for determining the location of a user that accounts for both modeling uncertainties and measurement noise.

Inputs provided to method 400 include GNSS data and SNR data. One of the drawbacks of the bootstrap PF described with respect to FIG. 3 is that particles are drawn from the output of the motion model, which may result in particles becoming trapped in local maxima of the posterior distribution (which is particularly common in urban environments). The advanced PF described with respect to FIG. 4 overcomes this shortcoming by sampling from an optimal proposal distribution that takes into account the current measurements, as opposed to sampling from the motion model. A benefit of sampling particles in this way is that it allows particles to be drawn from a wider range of possibilities than if constrained to sampling from the motion model. In this way, the advanced PF samples particles in a way that allows additional particle locations to be analyzed (i.e., allows the particles to explore the 3D space more freely) and therefore avoids particles becoming trapped in locations due to the inability of the particles to escape the confines of the motion model.

In particular, at step 402 the advanced PF establishes a likelihood surface (LS) based on received GNSS data. In general, the likelihood surface defines for a large area likely regions or locations where a user may be located. For example, in one embodiment the likelihood surface is created at step 402 by computing a kernelized estimate of the measurement surface with support in the 3D (x, y, and z) position space:

$$p(z_t, y_t | x_t) \approx \sum_{i=1}^{M} p_t^{(i)} N(x_t | \mu_t^{(i)}, \Sigma) \quad (26)$$

with kernel weights $$\rho_t^{(i)} = p(y_t | \mu_t^{(i)}) \prod_n p(z_{t,n} | \mu_t^{(i)}) \quad (27)$$

and circular bandwidths $\Sigma = \tau^2 I_3$ that define the spread/size of the likelihood surface. In one embodiment, kernel centers $$\{u_t^{(i)}\}_{i=1}^{M}$$

are generated on a regular lattice (e.g., face centered cubic lattice) with inter kernel distances on a meter scale (e.g., 1-2 meters), and selected as the union of ellipses/ellipsoids around the GNSS position fix and motion predicted particle set (generated at step 418 by the motion model). The size of the ellipses/ellipsoids may be varied based on a trade-off between computational complexity and breadth of particles to include for analysis. The larger the ellipse, the greater the intersection between the respective ellipses surrounding the GNSS position fix and motion predicted particle set, and the larger and more computationally complex the generated likelihood surface becomes). In one embodiment, the size of the ellipse/ellipsoids is selected to represent approximately five sigma deviation around the GNSS position fix and particles included in the motion predicted particle cloud.

Having established the LS at step 402, particle weights are updated at step 403 via fix matching particle weight updates provided at step 404 and shadow matching particle weight updates provided at step 406. As discussed above with respect to FIG. 3, GNSS fix matching particle weight update may utilize on one or more of the adaptive outlier model and the decorrelation model to determine the weight or influence to be given the GNSS position fix data. In other embodiments, the adaptive outlier model and/or decorrelation model may be implemented as part of establishing the likelihood surface region at step 402. Similarly, shadow matching particle weight update is provided at step 406 using the SNR model. Both the fix matching particle weight update and the shadow matching particle operate in much the same way as described with respect to the bootstrap PF shown in FIG. 3, with the likelihood surface being utilized as the particle filter point set. The outputs of the fix matching particle weight update and shadow matching particle weight update provided at steps 404 and 406 are combined (e.g., multiplied together) to generate a weighted likelihood surface. At step 408, the weighted likelihood surface may be optionally sampled/weighted based on the motion-predicted distribution generated by the motion model at step 418 (and optionally resampled at step 420).

The resulting particle proposal distribution is expressed as:

$$q(x_t \mid x_{t-1}^{(k)}, y_t, z_t) \approx \frac{1}{Z} N(x_t \mid \Phi_t x_{t-1}^{(k)}, \Phi_t \Lambda_{t-1} \Phi_t^T + Q_t) \sum_{i=1}^{M} \rho_t^{(i)} N(x_t \mid \mu_t^{(i)}, \Sigma) \quad (28)$$

The first portion of equation (28), $N(x_t \mid \Phi_t x_{t-1}^{(k)}, \Phi_t \Lambda_{t-1} \Phi_t^T + Q_t)$, represents the motion-predicted distribution generated by the motion model at step 418, and is identical to the motion predicted distribution utilized in the bootstrap PF as shown in Equation (24). The latter portion of equation (28) represents the weighted likelihood surface generated at step 403. The addition of the likelihood surface term provides for samples to be drawn from outside those particles proposed by the motion model and prevents particles from becoming trapped in local maxima if only the first term was utilized. Particle weights may (optionally) be calculated at step 408 as follows:

$$w_t^{(k)} \propto w_{t-1}^{(k)} \int p(x_t \mid x_{t-1}^{(k)}) p(y_t, z_t \mid x_t) dx_t \quad (29)$$

where the integral evaluates (approximately) to the sum of the weights of the Gaussian mixture for $q(\bullet)$ in equation (28), and represents a combination of the motion predicted particle set estimate calculated at step 418 (and optionally sampled at step 420) and the weighted likelihood surface calculated at steps 402 and 403. In one embodiment, because products of Gaussian distributions are themselves Gaussian, sampling from this distribution for each value k becomes a Rao-Blackwellized sampling from the Gaussian mixture $q(\bullet)$ in equation (28). Specifically, each particle selects a likelihood surface kernel location at random, with particle k selecting kernel i with probability proportional to $$\int N(x_t \mid \Phi_t x_{t-1}^{(k)}, \Phi_t \Lambda_t \Phi_t^T + Q_t) \cdot \rho_t^{(i)} N(x_t \mid \mu_t^{(i)}, \Sigma) dx_t \quad (30)$$

Note that this expression is easy to evaluate due to the fact that the product of two Gaussian distributions is itself a (un-normalized) Gaussian distribution, and because any probability distribution integrates to one by definition. In this embodiment, particle k then assumes the position distribution $N(x_t \mid \mu_t^{(i^*)}, \Sigma)$ where i* is the index of the selected likelihood surface kernel. The non-position coordinates' distribution is then set according to the normal rules of Rao-Blackwellized (conditional Gaussian) sampling. Although this type of sampling is not difficult, it is computationally expensive: kernel selection probabilities must be computed for each kernel-particle pair, yielding a computational complexity of O(KM) where M is the number of likelihood surface kernels and K is the number of particles. Therefore, in one embodiment the sampling is modified to recognize that for clusters of nearby particles the vast proportion of proposed KDE kernel selection probabilities are very small, due at least in part to motion constraints. Hence, in general, for a cluster of particles only a small number M'<<M of the total likelihood kernels must be examined. This observation can be utilized by using a KD tree clustering on the particles and box and bound technique to provide an upper bound on the kernel selection probabilities by a small number (e.g., $10^{-6}$) for a given cluster of particles, and then prune those kernels from that clusters version of the KDE (likelihood surface). These operations may be performed in parallel across the plurality of clusters.

Depending on the in-cluster particle spread, volume of the KDE support, firmness of motion constraints, etc., the complexity of the sampling operation may be reduced significantly. In another embodiment, KD trees for both the particles and likelihood surface are created (as opposed to just the likelihood surface), and computational efficiency is further improved.

In this way, advance sampling/weighting of particles at step 408 may be utilized to generate an optimally sampled particle set, wherein the optimally sampled particle set may be provided as the particle set estimate, or may optionally be provided as an input to one or more additionally optional steps (e.g., particle reset at step 410, road matching/output clamping at step 412). These steps may be performed alone or in combination with one another.

In one embodiment, particle reset at step 410 allows a portion of the particles to be sampled from the likelihood surface (rather than from the motion model). In particular, because of the KDEs generated at step 402 as part of the likelihood surface, a portion of these particles can be sampled directly from the likelihood surface. The benefit of selecting particles directly from the likelihood surface is that it encourages the particle filter to explore different parts of the environment. In particular, localization space is oftentimes multimodal, and particle resetting in this manner encourages the particle filter to explore different locations and track more modes in the localization space.

In addition, at step 412 a road matching/output clamping operation may be performed. Road matching at step 412 operates in the same manner as road matching provided in the bootstrap PF, and described in additional detail with respect to FIG. 11. In general, road matching at step 412 adds as an additional measurement vector to the measurement model possible street assignments which varies by particle location. The result of road matching is modification of the particle weights assigned by fix matching particle weight update or the shadow matching particle weight update. In one embodiment, road matching is inserted directly into the PE alongside the fix matching particle weight update and/shadow matching particle weight update. However, in the embodiment shown in FIG. 4 (as well as FIG. 3) the implementation is simplified by operating the normal PF update, and then performing a road matching update on the nominal output particle set. In this embodiment, the weights targeting the posterior distribution at time t are, for particle k, given by $$w_t^{(k)} \propto \tilde{w}_t^{(k)} p(s_t^{(k)} \mid x_t^{(k)}) \quad (31)$$

where $\tilde{w}_t^{(k)}$ is then weight after applying the non-road matching PF update. The weights are then (as usual) normalized to sum to one.

In addition, at step 414 the nominal output particle set (with or without road matching) is utilized to determine whether the user is located indoors. As discussed above with respect to 312, the determination of whether the user device is located indoors is based on review of the SNR measurements to determine the probability that all SNR measurements are NLOS. If all satellites are determined to be NLOS, this is indicative that the user has moved indoors and an appropriate output can be generated.

In addition, the advanced PF provides the particle set estimate output (i.e., current update) in feedback to steps 416-420 in order to generate a predicted particle set. In particle, at step 416 a one update delay is introduced such that the particle set estimate output (current update) becomes the previous update as additional measurement data becomes available. For example, in one embodiment the delay value is set equal to approximately one second.

At step 418, the motion model is utilized to generate a predicted particle set estimate. The motion model utilized in the advanced PF operates in the same way as described with respect to the bootstrap PF. In particular, the motion model (as described with respect to Equations 4-6, above) generates a predicted particle set that represents how particles are predicted to propagate in a single time step. Once again, the predicted particle set for the kth particle, $q(x_t|x_{t-1}^{(k)})$ is taken to be the motion predicted distribution, which for the nominal linear Gaussian model leads to $$x_t^{(k)} \sim q(x_t|x_{t-1}^{(k)}) = p(x_t|x_{t-1}^{(k)}) = N(x_t|\Phi_{t-1}^{(k)}, \Lambda_{t-1}\Phi_t^T + Q_t) \quad (32)$$

At step 420, the predicted particle set estimate is provided in feedback to step 402 to establish the likelihood surface in the next time step. In addition, the predicted particle set estimate may be provided in feedback—via resampling step 420—to advance sampling/weighting step 408 as described above in generation of the optimally sampled particle set.

Figure 5A:
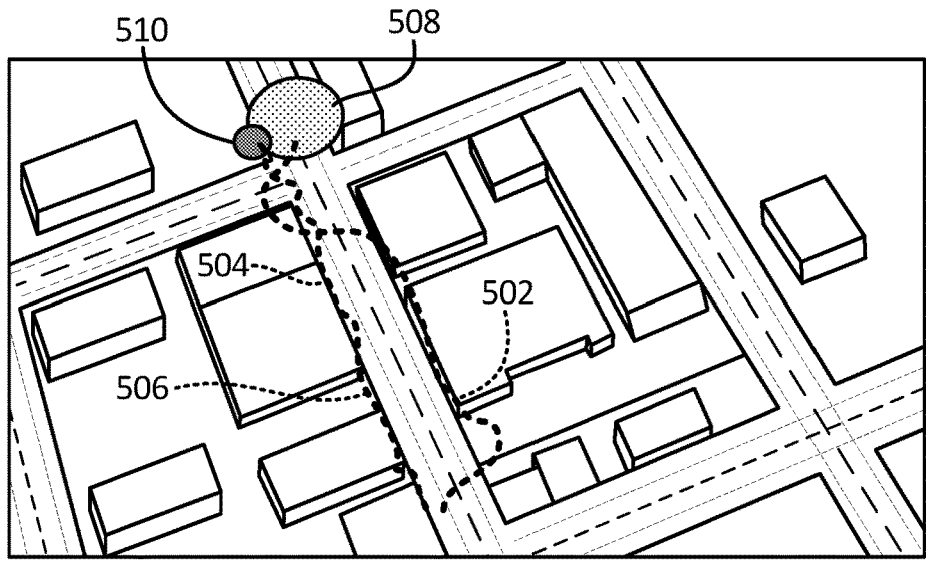
FIGS. 5*a*-5*c* are examples illustrating utilization of the advanced PF ace to an embodiment of the present invention
Figure 5B:
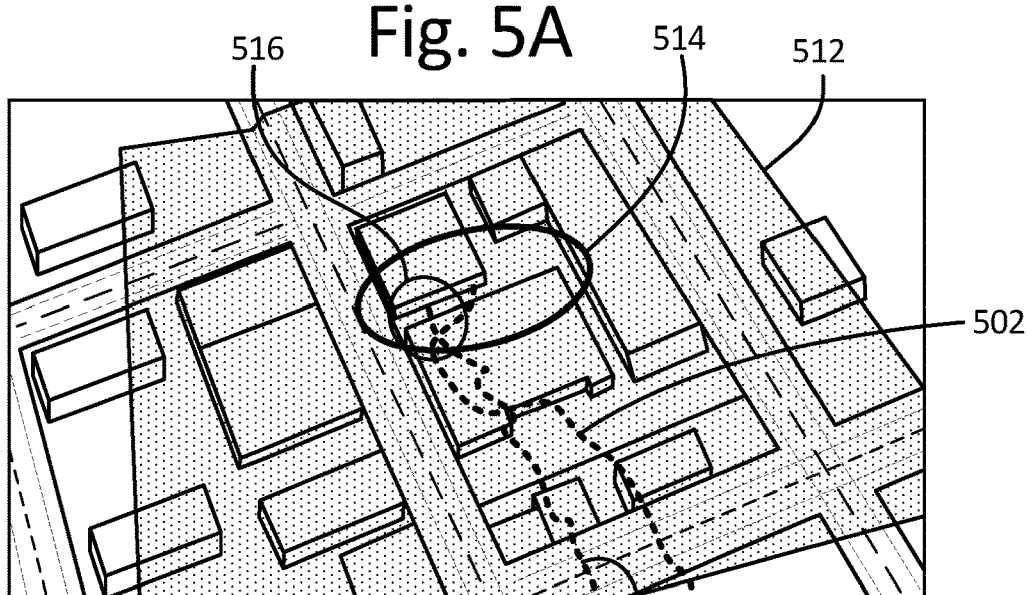
Figure 5C:
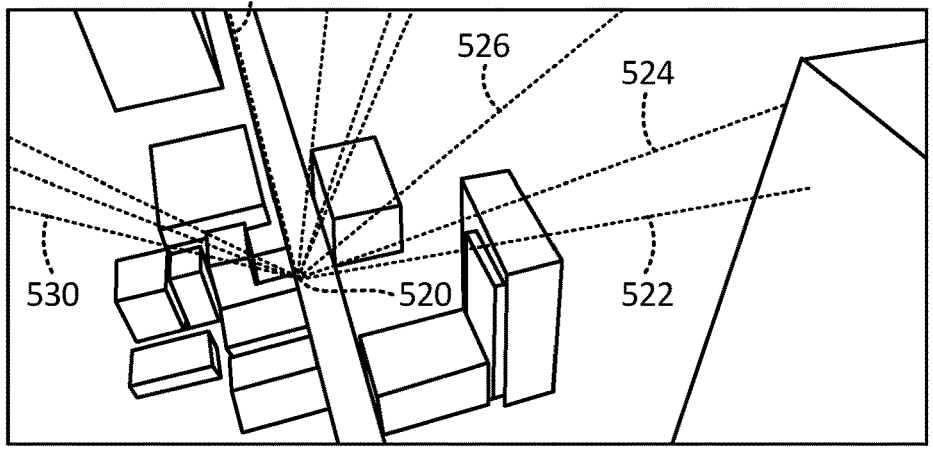

FIGS. 5a-5c are examples illustrating utilization of the advanced PF according to an embodiment of the present invention. In particular, FIG. 5a illustrates the GPS reported fix (position) (502), the particle filtered estimate (504), and the ground truth path (504). FIG. 5b illustrates the SNR likelihood surface and error ellipses. FIG. 5c illustrates a composite SNR/GPS likelihood surface. These examples are used to illustrate steps performed as part of method 400.

FIG. 5a shows a top view of a city. The ground truth (i.e., actual path) of the user is illustrated by the line 506. The GNSS estimate provided by the satellite to the user device—without localization improvement—is illustrated by the dashed line. The improved position estimate provided by the localization server to the user device is a result of the advanced PF described with respect to FIG. 4, and is illustrated with line 504. In particular, FIG. 5a illustrates that the GNSS estimate illustrated by line 502 makes a cross-street error in which the GNSS estimate incorrectly positions the user on the wrong side of the street from the user's actual location. The advanced PF corrects this error because the SNR likelihood has a strong peak on the correct side of the street. Dashed circle 508 is centered around the current GNSS reported fix (position) estimate, with dashed circle 508 representing the determined uncertainty associated with the estimate (i.e., 68% confidence circle). Filled in circle 510 is centered around the particle filtered estimate and represents the same certainty associated with dashed circle 508 (e.g., 68%). However, because the confidence in the particle filtered estimate is much higher than with respect to the GNSS reported fix, circle 510 is much smaller than circle 508.

FIG. 5b shows the measurement (i.e., SNR) likelihood surface 512 (illustrated by the rectangular shape, with cross-hatched lines), wherein the likelihood surface includes a heat map (not visible in this view) that illustrates the most likely places for a user to be located within the likelihood surface 512. The SNR likelihood surface 510 is highlighted and centered over the reported GPS fix (i.e., position). The SNR likelihood surface covers a large area that extends outside of the uncertainty estimates 514 and 516 associated with the GPS fix and particle filter estimates, respectively. The large area covered by the likelihood surface 512 allows particles drawn from this surface area to be utilized to avoid capture in local maximums. A benefit of this approach, as illustrated in FIG. 5b, is that particles can be selected from regions outside of those predicted by the motion model, thereby allowing the advanced particle filter to explore the space defined by the likelihood surface 512 (and in particular, those regions indicated by the heat map in which a user is most likely to be located. In addition, uncertainty estimates 514 and 516 associated with the GPS fix (i.e., GNSS estimate of position) and the particle filter estimate, respectively, illustrates the increased certainty obtained via the advanced PF filter. The uncertainty estimate 514 illustrates the 3σ (three sigma) uncertainty associated with the (incorrect) GNSS fix position estimate. Uncertainty estimate 516 illustrates the 3σ (three sigma) uncertainty estimated around the (approximately correct) location estimate provided by the particle filter.

FIG. 5c illustrates ray tracing from a point representing the particle filter MMSE estimated position 520 of the user device. In the embodiment shown in FIG. 5c, tracing of ray 522 indicates with a fairly high likelihood that the satellite is blocked by the building on the right. Ray tracing to various other satellites from point 520 indicates varying likelihoods of blockage, with ray trace 528 indicating a high likelihood that the corresponding satellite is not blocked (i.e. LOS).

Figure 6:
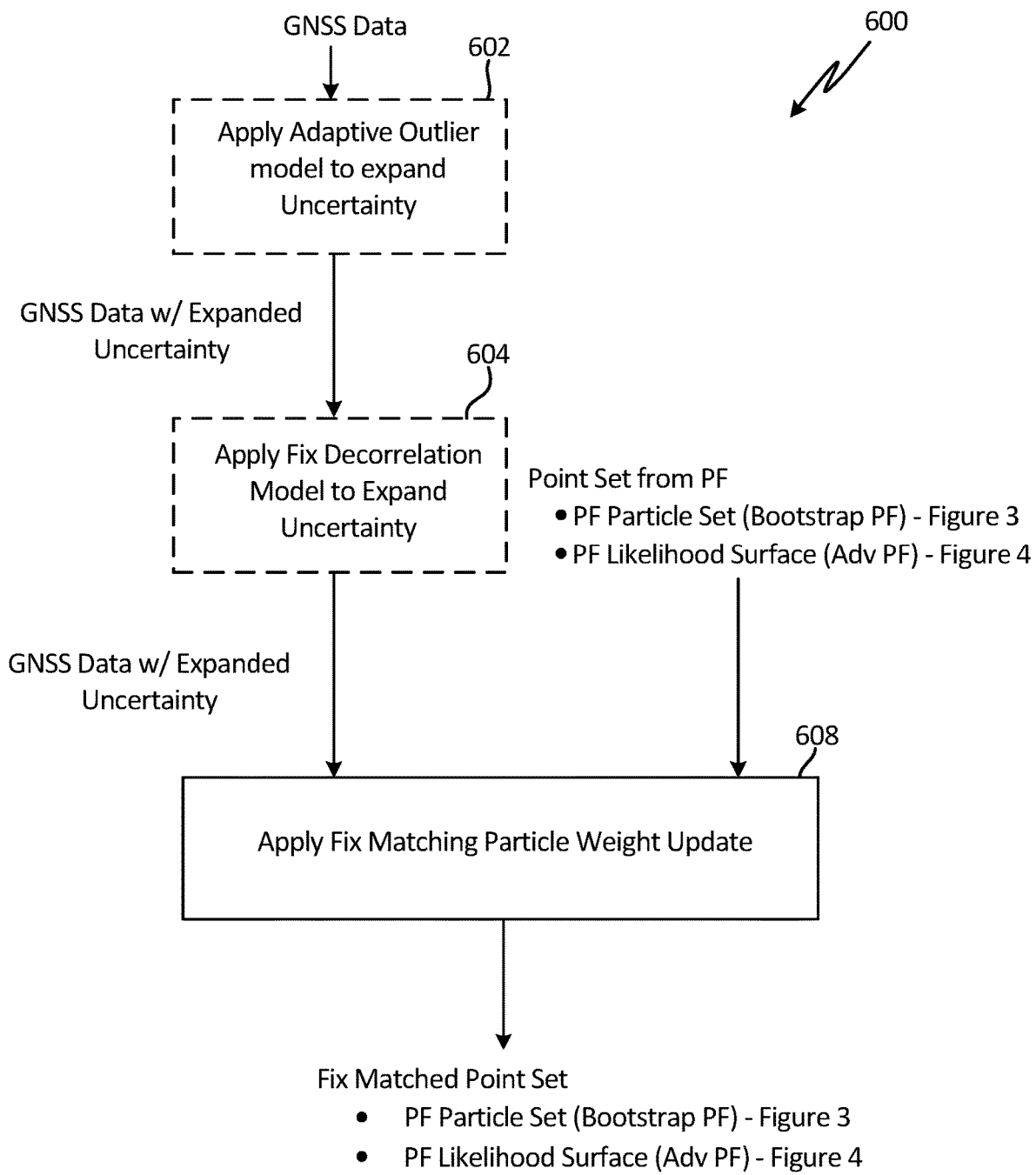
FIG. 6 is a flowchart that illustrates steps performed by the localization server to implement fix matching according to an embodiment of the present invention.

FIG. 6 is a flowchart that illustrates steps performed by the localization server to implement fix matching model 600 according to an embodiment of the present invention. Fix matching model 600 may be implemented as a measurement model included in either the bootstrap PF described in FIG. 3 or the advanced PF described in FIG. 4. As described above with expect to the measurement models utilizes, GNSS fixes sometimes exhibit an attractor or correlation problem. In particular, in response to a user remaining stationary for a period of time (e.g., few seconds), and because the GNSS measurements are assumed to be independent, identically distributed (iid) Gaussians, the PF can be attracted or drawn towards the erroneous—and stationary GNSS estimate, even when inconsistent with the shadow matching SNR estimates. The present invention contemplates several methods—used alone or in conjunction with one another for mitigating these tendencies. The first is to modify the measurement model to allow for outliers, which results in particles remaining in the PF set that may otherwise have been excluded as not relevant. The second provides a method of de-correlating successive GNSS fixes from one another to prevent particles from collapsing into a single, erroneous location. These methods are described below with respect to FIGS. 6 and 7. In both cases, the goal is to expand the uncertainty associated with the particle set to include particles that may otherwise have been discarded.

Inputs include GNSS fix data (i.e., position) is received from user device 102 (shown in FIG. 1). The GNSS fix may include an uncertainty value associated with the location provided by the GNSS fix data. In one embodiment GNSS fix data also includes velocity data as well as uncertainty information associated with the received velocity. In addition, a particle filter (PF) point set or PF likelihood surface is received from the particle filter, depending on whether the bootstrap particle filter is utilized as described with respect to FIG. 3 or the advance particle filter as described with respect to FIG. 4. The PF point set or PF likelihood surface represent a collection of particles that represent likely locations of the user device.

At step 602, the uncertainty associated with the location estimate is expanded via application of an adaptive outlier model (i.e., the particle set is expanded to include particles that may not otherwise be included). Expanding the particle set to include outliers addresses the problem of GNSS position fixes generated based on strong reflections (i.e., reflections with high SNR values). Because they are reflections, the GNSS position fix is inaccurate, despite the signal indicating LOS or near LOS signal strength. Expanding the position measurement $y_t$ via application of the adaptive outlier model acts to prevent the particle filter from generating incorrect position estimates that exclude other particles from being considered.

In one embodiment, in one embodiment the adaptive outlier model is a modification to the measurement model wherein the GNSS position fix is modeled as a mixture of a reported Gaussian $\tilde{y}_t \sim N(x_t, C_t)$ (the covariance is estimated using standard Dilution of Precision techniques) and an outlier vector $e_t$ which comes from a broad multivariate elliptical distribution (e.g., uniform, T, Cauchy, or another Gaussian with a large covariance):

$$y_t = (1-\alpha)\tilde{y} + \alpha e_t \tag{33}$$

where $\alpha$ is the outlier probability which is potentially coarsely adapted by scenario (i.e., $\alpha$ can be made larger for more built-up environments). In this way, a particular urban environment may be assigned a value $\alpha$ based on the level of development (i.e., number of buildings, building height, etc.) and utilized by the measurement model to increase the number of outliers included.

At step 604, uncertainty is expanded, but via application of a fix deco elation model. The fix decorrelation model is described in more detail with respect to FIG. 7. In general, the fix decorrelation model acts to reduce the effect of correlations between successive GNSN fix estimates. For example, assume a pedestrian is stopped at an intersection, waiting to cross the street. Successive GPS fixes over the time the pedestrian spends stopped at the intersection may have significant errors due to issues such as strong reflections (as discussed above). Because the incorrect particle fix is maintained over several successive iterations (because the user is stopped), the particle filter estimate can end up being "pulled" to the GNSS position fix, even though it is in disagreement with other measurements such as SNR. In addition, the influence associated with the particle filter is reduced to alleviate the "GNSS attractor" problem.

In the embodiment shown in FIG. 6, steps 604 and 606—both of which act to expand the uncertainty associated with position fixes—are optional steps that may be utilized alone or in conjunction with one another.

At step 608, the PF point set or PF likelihood surface is compared with the GNSS fix data (having expended uncertainty depending on utilization of the adaptive outlier model and fix de-correlation model) to evaluate points against the fix and to update weights associated with each point in the point set. For example, for each particle k sampled, a weight $w_t^{(k)}$ is calculated for the point based on the previous weight associated with the particle k and the conditional probability of the particle k being located at position fix x given GNSS fix data (as well as perhaps the SNR data).

$$w_t^{(k)} \propto w_{t-1}^{(k)} p(z_t, y_t | x_t^{(k)}) \tag{34}$$

wherein the weights $w_t^{(k)}$ evaluated for each particle k indicate how likely it is that the user is located at the position of particle k given the most recent measurement data, including GNSS data $y_t$ and SNR data $z_t$.

The fix matched point set is provided as an output, wherein the fix matched point set includes weights assigned to the plurality of points k included in the PF point set or PF likelihood surface. The output may be utilized in the PF particle set (utilized in the bootstrap PF) as well as the PF likelihood surface (utilized in the advanced PF).

Figure 7:
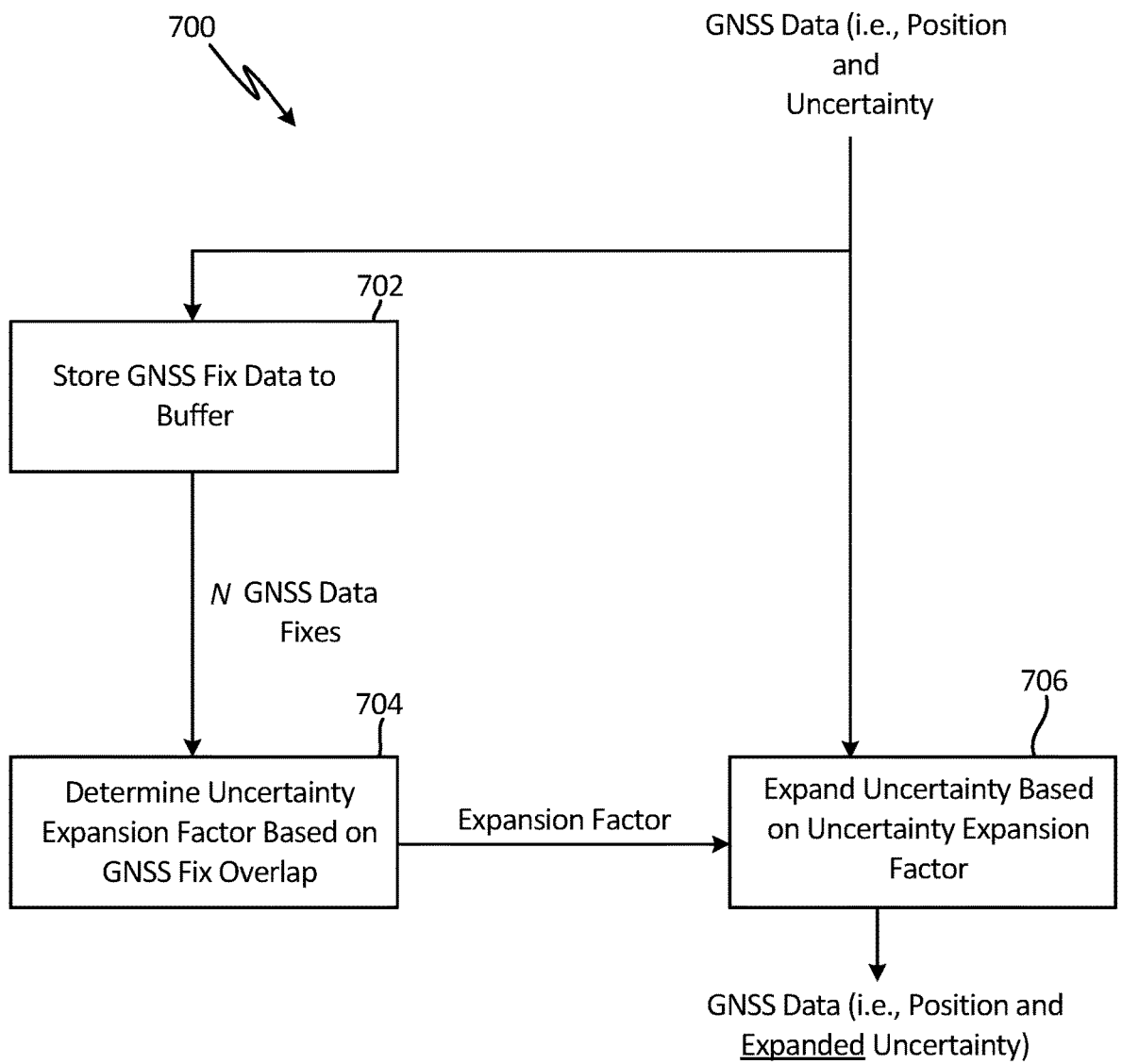
FIG. 7 is a flowchart that illustrates steps performed by the localization server to implement fix correlation according to an embodiment of the present invention.

FIG. 7 is a flowchart that illustrates steps performed by the localization server to implement fix correlation according to an embodiment of the present invention. As discussed with respect to FIG. 6, fix decorrelation models may be utilized to expand uncertainty in GNSS fixes in order to mitigate the "GNSS attractor" phenomenon in which the output of the particle filter is drawn to the GNSS fix measurement (i.e. position). The embodiment shown in FIG. 7 illustrates one possible method of expanding uncertainty and de-correlating successive GNSS fixes.

GNSS fix data is received as an input as well as the uncertainty associated with the GNSS fix data. As described above, correlation between successive GNSS measurements not only attracts the output of the PF filter to the GNSS fix, but also decreases the uncertainty associated with the GNSS fix, making it even more difficult to break out of the incorrect location estimate.

In the embodiment shown in FIG. 7, the general idea is to identify the overlap between successive GNSS fixes, based on the understanding that successive fixes that overlap more with one another are more correlated with one another. For example, this would be represented by the situation in which a user is stopped at an intersection and has not moved for several minutes. As a result, successive GNSS fixes (i.e., position estimates) will overlap quite a bit with one another and therefore are more correlated with one another. The exact amount of overlap may be defined as a parameter $o_t$ falling between the range of [0, 1], wherein one indicates a high level of correlation and zero indicates a ow level or no correlation, and wherein $n_t$ is a very broad, elliptically bounded uniform density centered at zero. As the amount of overlap a, increases towards one, the condition probability of $p(y_t|x_t)$=a constant in a large region, and successive GNSS fixes do not impact particles in this region, effectively mitigating PD. In contrast, as the amount of overlap $o_t$ decreases towards zero, indicating that new information is being received from the GNSS fix information provided by the user's device, then we recover our original fix density which allows the GPS to track the user once new information is provided.

The embodiment shown in FIG. 7 makes use of what is known as the Gaussian overlap model, in which a buffer of Gaussian approximations to the K most recent fixes, estimated for example using the standard Dilution of Precision technique. In the embodiment shown in FIG. 7, at step 702 recent GNSS fixes are stored to a buffer for subsequent analysis. At step 704, overlap between the recent GNSS fixes can be characterized as a type of inner product between densities:

$$o_t = \frac{1}{Z} \int \prod_{k=0}^{K-1} N(x | y_{t-k}, C_{t-k}) dx \tag{35}$$

where the integration region is either $\mathbb{R}^2$ or $\mathbb{R}^3$ depending on whether tracking is conducted in two dimensions or three dimensions. A normalization constant Z ensures that $o_t \in [0, 1]$ as $$Z = \int N(x | 0, C_{t-k_*})^K dx, \quad k^* = \underset{k}{\mathrm{argmin}} |C_{t-k}| \tag{36}$$

which is un-normalized overlap of K identical successive measurements with the smallest covariance of the previous K observed fixes. In one embodiment, having calculated the overlap ratio a low pass IIR filter may be applied to smooth the overlap ratios $$\hat{o}_t = \alpha o_t + (1-\alpha)\hat{o}_{t-1} \quad (37)$$

with typical values α=0.3 to 0,5. For embodiments in which the update rate is around 1 Hz, this yields an effective averaging window of a couple seconds, making the procedure more robust to spurious measurements while preserving its overall operation. Having computed the overlap ratio $o_t$, or $\hat{o}_t$, at step 706 uncertainty in the fix measurement (defined above as $y_t = Hx_t + e_t$) is expanded (i.e., penalized) based on the overlap ratio as follows:

$$y_t = Hx_t + (1-o_t)e_t + o_t n_t \quad (38)$$

In this way, as the overlap value $o_t$ increases, more influence is given to the value of the elliptically bounded uniform density centered at zero ($n_t$), while the influence of the term $e_t$ is minimized. Conversely, as the value of $o_t$ decreases to zero (or near zero)—indicating that new data is being received—then less influence is given to the value of the elliptically bounded uniform density centered at zero ($n_t$) and the equation reverts to approximately $y_t = Hx_t + e_t$ as described above.

The GNSS fix position and expanded uncertainty is provided as an output of step 706. As discussed with respect to FIG. 6, the GNSS fix position and expanded uncertainty is provided as an input to the fix matching step described at step 610 (shown in FIG. 6) to compare the GNSS fix position with the provided particle set.

In other embodiments, rather than utilize a buffer of Gaussian approximations to calculate the overlap parameter $o_t$, the overlap parameter $o_t$ is defined as a function of dispersion in the GPS fixes. In one embodiment, dispersion is defined as estimated velocity divided by standard deviation of the GNSS position fix, estimated over a short window of time or measurements. In other embodiments, other means may be utilized to calculate the overlap parameters $o_t$.

Figure 8:
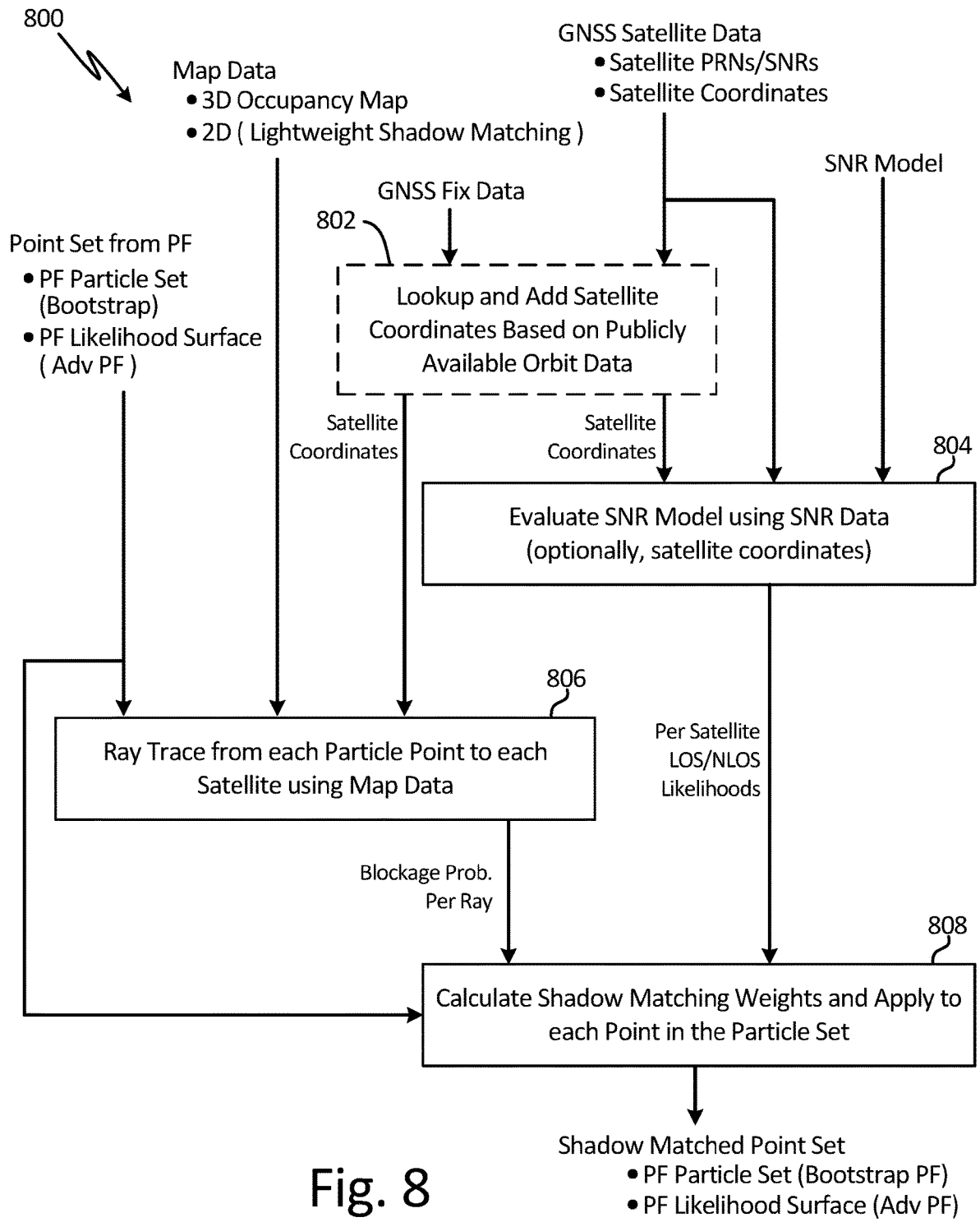
FIG. 8 is a flowchart that illustrates steps performed by the localization server to implement shadow matching according to an embodiment of the present invention.
Figure 9:
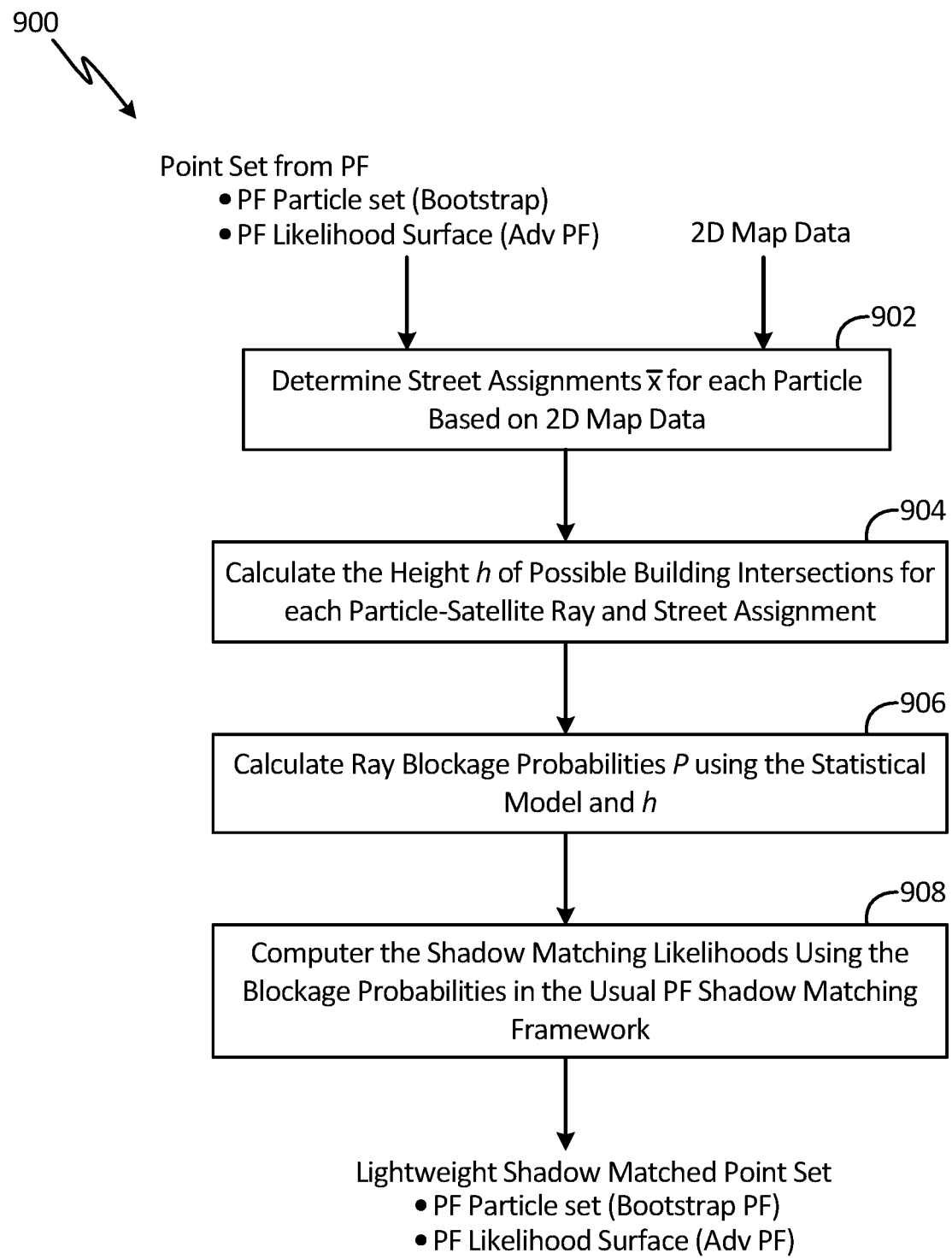
FIG. 9 is a flowchart that illustrates lightweight shadow matching according to an embodiment of the present invention.

FIG. 8 is a flowchart that illustrates steps performed by the localization server to implement a shadow matching model according to an embodiment of the present invention. As discussed above, shadow matching utilizes GNSS and SNR measurements to update particle weights. In particular, shadow matching determines the probability of a signal being a line-of-sight (LOS) signal or a non-line-of-sight (NLOS) signal based on the observed/measured SNR of the each received satellite signal, and determines the probability or likelihood of a satellite signal being blocked based on the location of the particle and the satellite using a 3D reconstruction or map of the user's environment. In addition, FIG. 8 provides some less computationally expensive alternatives. For example, the ray tracing required to determine the probability of a satellite signal being blocked requires a ray to be generated for each particle-satellite pair, which can result in thousands of rays having to be drawn and analyzed to determine the blockage probability. This is computationally expensive. Alternatives to these methods are also described herein which are computationally less expensive (dubbed "lightweight" shadow matching). Having determined the LOS/NLOS likelihoods and the blockage probabilities, these values can be utilized to calculate and update weights describing the likelihood of a particle being located at a particle location based on observed measurements (i.e., GNSS and SNR data). The techniques described with respect to FIG. 8 may be utilized in both the bootstrap PF (shown in FIG. 3) and the advanced PF (shown in FIG. 4).

In the embodiment shown in FIG. 8, a number of inputs are utilized as part of the shadow matching technique, including GNSS satellite data, GNSS fix data, map data, point set data from the particle filter, and an SNR model.

For example, GNSS satellite data is received from user device 102 (shown in FIG. 1) and includes SNR measurements associated with received satellite signals and information regarding the location of the satellite. In one embodiment, GNSS satellite data includes pseudorandom noise (PRN) information that identifies particular satellites. In other embodiments, the GNSS satellite data includes coordinates indicating the location of the satellite. GNSS fix data includes position estimates generated by the user device 102 based on the received GNSS signals (but without the benefit of particle filtering). GNSS fix data may include latitude/longitude information, along with the typical fix error and a timestamp identifying when the position fix was captured. Map data may include a 3D occupancy map that allows ray tracing between the user device and the satellite to determine whether the satellite signal is LOS or NLOS. However, in other embodiments if a 3D occupancy is not available, then either a 2D map may be utilized or statistical information identifying the amount of build-up in the area surrounding the user device. Point set data 808 may include the PF point set generated by the bootstrap PF (shown in FIG. 3), or the PF likelihood surface generated by the advanced PF (shown in FIG. 4).

At step 802, satellite coordinates are determined if not already provided as part of the received GNSS satellite data. For example, in embodiments in which the GNSS satellite data includes only PRN identification information, then at step 802 the PRN data is utilized to lookup satellite coordinates/locations based on publicly available orbit data. For example, as shown in FIG. 2, the satellite PRN data is provided to a satellite estimate server 204, which looks up the satellite and in response provides satellite coordinate data.

At step 804, the SNR model is evaluated using measured SNR data (as well as optionally, satellite coordinates). In general, evaluating the SNR model includes determining on a satellite-per-satellite basis the probability of whether the received signal is line-of-sight (LOS) or non-line-of-sight (NLOS) based on the relative strength or magnitude (i.e., the SNR) of the received GNSS signal. For example, the probability of a signal being LOS is higher when the SNR is high, and lower when the SNR is low. Various distributions may be utilized to model this probability. As discussed above, the Rician distribution described in Equations 6 and 7, above, has been found to perform well in determining the probability of an SNR signal being LOS. For determining the probability of a signal being NLOS, it has been found that a lognormal distribution performs well. The terms $f_{los}(\cdot)$ and $f_{nlos}(\cdot)$ represent the LOS and NLOS satellite likelihoods, provided on a per satellite basis.

At step 806, for each particle in the particle set being analyzed, a determination is made regarding the probability of a signal received from each of the plurality of satellites being blocked. A plurality of solutions may be utilized to determine the probability of a satellite being blocked. In one embodiment, ray tracing is utilized in conjunction with a 3D occupancy grid map $o(m) = \{p(m_i)\}_i$ made up of voxels $m = \{m_i\}_I$, we have $$P_{t,n,k} = 1 - \Pi_{i \in M_{t,n,k}} p(m_i = 0) \quad (39)$$

where $M_{t,n,k}$ indexes the intersected voxels and $m_i \in \{0,1\}$ signifies empty/occupied states, respectively. A drawback of this approach is that it requires computing the voxels intersected by each ray, wherein rays must be drawn between each particle and each satellite. With thousands of particles analyzed in each iteration, and tens of satellites this becomes a computationally expensive endeavor. Therefore, the present invention contemplates alternatives that our computationally less expensive.

One embodiment—described herein as the lightweight shadow matching approach—does not require a 3D map and does not require ray tracing from each particle in order to determine probability of a signal being blocked. Rather, the lightweight shadow matching approach requires (1) a road network and (2) coarse building height statistics. The road network assumes that buildings begin at specific known distances from street centerlines and that building heights are random variables. That is, instead of requiring a 3D map, this embodiment requires a road network that identifies street centerlines and widths (or street type which maps to some approximate width). In one embodiment, this data is obtained from the US Census Bureau, which maintains a database of such information via the TIGER database. The coarse building height statistics (such as means, standard deviations or maximums) are utilized in order to parameterize build height probability distributions. Generally, this data can vary as a function of location in order to accurately capture differences in building heights across regions of a city. One possible data source is OpenStreetMap (OSM), which provides building footprints and heights (or number of stories) in select regions.

Figure 10:
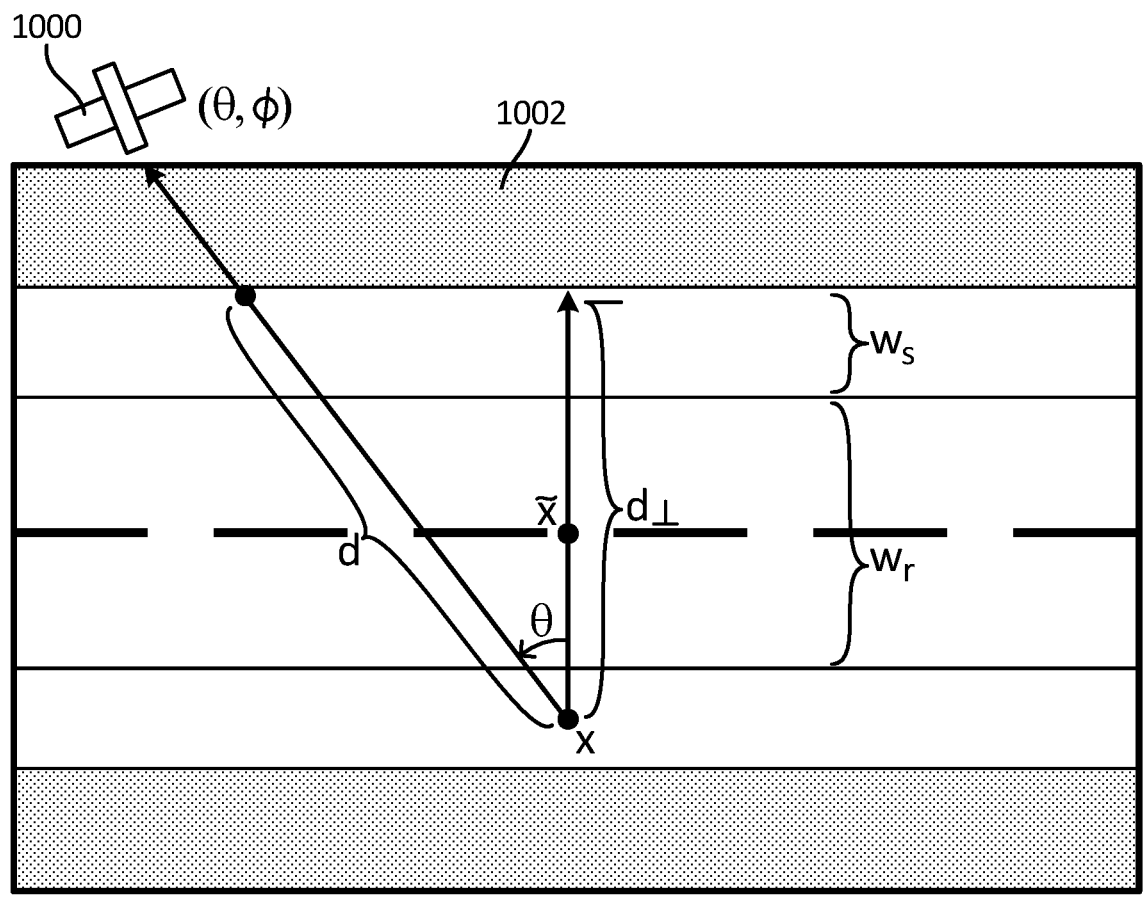
FIG. 10 is a top-view diagram that illustrates approximations utilized in a light shadow-matching technique according to an embodiment of the present invention.

As described in more detail with respect to FIGS. 9 and 10, the lightweight shadow matching algorithm determines street assignments for each particle, and calculates the height of possible building intersections based on the street assignment. Ray blocking probabilities are calculated using the statistical model and the calculated height of the buildings. The calculated ray blockage probabilities are then utilized in the same way as the calculated ray blockage probabilities calculated using the ray tracing algorithm At step 808, the ray blockage probabilities and the LOS/NLOS likelihoods are utilized to compute and apply shadow matching weights for each position point. In the probabilistic PF framework, at time t given a set of particles $\{x_t^{(k)}\}_k$ and satellite SNR measurements $z_t = [z_{t,1}, \ldots, z_{t,N}]^T$, shadow matching is provided by computing likelihoods of the form $$p(z_t | x_t^{(k)}) = \prod_{n=1}^{N_t} p(z_{t,n} | x_t^{(k)}) \qquad (40)$$

$$\propto \prod_{n=1}^{N_t} \left[ 1 + \left( \frac{f_{nlos}(z_{t,n})}{f_{los}(z_{t,n})} - 1 \right) P_{t,n,k} \right]$$

where the terms $f_{los}(\cdot)$ and $f_{nlos}(\cdot)$ represent the LOS and NLOS satellite likelihoods based on SNR and $P_{t,n,k}$ is the blockage probability of the ray to the nth satellite from particle $x_t^{(k)}$. The calculated conditional probability for each particle location $x_t^{(k)}$ represents a weight that is then applied to the point set from the PF (e.g., PF particle set or the PF likelihood surface). The result is a shadow matched point set provided as an output at step 820. As discussed above the shadow matched point set may be utilized in conjunction with the bootstrap PF or the advanced PF.

FIG. 9 is a flowchart that illustrates in additional detail the lightweight shadow matching technique described with respect to FIG. 8, above. FIG. 10 is a top view diagram of a street with labels utilized in describing operation of the lightweight shadow matching technique. As discussed above, the lightweight shadow matching technique is a computationally less expensive method of determining ray blocking probabilities discussed with respect to step 806 in FIG. 8. As discussed above, the lightweight shadow matching technique does not require computationally expensive ray tracing from each particle. Rather, blockage probabilities for each point are calculated using a 2D or 2.5D map of the surrounding environment. Inputs to the lightweight shadow matching method include the point set from the particle filter (i.e., the PF particle set or the PF likelihood surface), as well as the 2D or 2.5D map.

At step 902, street assignments x̃ are determined for each particle x included in the point set. The goal of step 902 is to "clamp" or project the location of each proposed particle x to the centerline of each street with which it overlaps x̃. This is illustrated in FIG. 10, in which the particle x is located on the near side of the street. The projection x̃, if projected correctly, is located along the centerline of the road. In one embodiment, the projection can be done efficiently be using a sort-tile-recursive (STR) rectangle tree (R tree) to spatially index 2D road polygons and via caching, in which locations are quantized to a 2D grid and the results of the clamping are stored.

At step 904, the height h of possible building intersections for each particle-satellite ray and street assignment. In the embodiment shown in FIG. 9, calculating the heights of the ray-building intersections requires first computing the perpendicular distance, $d_\perp$, to the buildings from particle x in the direction of each satellite. For example, in the embodiment shown in FIG. 10, the satellite 1000 is located in the direction of the opposite side of the street from x. Thus, the signal from the satellite to particle x would intersect with building 1002 located across the street from particle x. The distance $d_\perp$ is therefore calculated between particle x and building 1002. In one embodiment, for all particles not located on streets or sidewalks, they are assumed to be on city blocks with intersection heights h=0. For all other particles, given nominal road and sidewalk widths $w_r$ and $w_s$, the perpendicular distance $d_\perp$ is given as $$d_\perp = w_r/2 + w_s \pm \|x - \tilde{x}\| \qquad (41)$$

with addition or subtraction of the clamping distance depending on whether the satellite is across the street. For a satellite with azimuth offset θ from the perpendicular direction the total horizontal distance to a potentially obstructing building is $$d = d_\perp \sec\theta \qquad (42)$$

This represents the distance to the building in the direction of the satellite from particle x. Finally, knowing the satellite elevation equal to φ, the building intersection height is given by $$h = d \tan\phi = d_\perp \sec\theta \tan\phi \qquad (43)$$

As a result, heights h are higher for higher satellite elevations and for satellites that are located along the direction of the street, rather than directly across the street. Note however, that the height h does not mean that a ray from the particle x to the satellite necessarily would intersect a building. Rather, this estimate indicates the height at which point the ray would intersect a building. In the lightweight shadow matching technique, 3D maps of the city are not available or utilized.

At step 906 a ray blockage probability P is calculated using the statistical model of the height of buildings located in the surrounding environment and the calculated height of h. In one embodiment, the ray blockage probability P is calculated by evaluating the Complimentary Cumulative Distribution Function (CCDF)

$$P=Pr(H \geq h) \quad (44)$$

Taking a uniform distribution with minimum and maximum heights 0 and $h_{max}$, respectively, the blockage probabilities would be $$P=1-h/h_{max} \quad (45)$$

which decreases with increasing height h (that is, and the intersection height h increases, it becomes less likely that a building will block the signal). In one embodiment, the height distribution (0, and $h_{max}$) vary as a function of 2D building intersection coordinates. In this way, the lightweight shadow matching algorithm generates a blockage probability $P_{t,n,k}$ without requiring a 3D map and ray-tracing between each proposed particle and each satellite.

Additional modifications to the lightweight shadow matching technique may be made to account for various conditions. For example, in one embodiment the lightweight shadow matching technique is ineffective at street intersections, in which fewer buildings are present to block signals. In one embodiment, a particle located at an intersection is assigned a minimum blockage probability $P_i$ over all street assignments i $$P=\min_i P_i \quad (46)$$

At step 908 shadow matching likelihoods are calculated using the blockage probabilities in the usual PF shadow matching framework. In this way, the lightweight shadow matching algorithm provides a computationally inexpensive method of determining the blockage probability between a particle and a satellite given some information about the environment, but without the benefit of a 3D model.

In other embodiments, various other modifications may be made to the lightweight shadow matching algorithm. In one embodiment, the potential that a more distant object is the cause of a blocking phenomenon (rather than the building directly across the street) can be accounted for via application of a simple 2D map formed around city blocks. Ray tracing can then be performed in 2D, rather than 3D, after which the over blockage probability could be evaluated as before. In another embodiment, building footprints are utilized to directly form 2D maps, and height information (to the extent it is available) is utilized to design the building height distribution.

FIG. 11 is a flowchart that illustrates steps performed by the localization server to implement road matching/clamping according to an embodiment of the present invention. The road matching/clamping embodiment shown in FIG. 11 is most applicable to vehicles, in which the inputs valued by a user include speed of the vehicle, bearing or direction and which street the vehicle is trawling down. In this context, road clamping refers to methods of ensuring a single "road clamped" point estimate for provision to the user.

In the embodiment shown in FIG. 11, inputs include a current posterior estimate (i.e., particle point set) that represents a most recent estimate of user location, as well as a road network map that identifies the location of roads within the area surrounding the user.

At step 1102, road matching likelihoods are calculated. As described above when describing inclusion of road matching in either the bootstrap PF or the advanced PF because road matching operates essentially as another type of measurement it may be incorporated directly into the particle weight update steps (i.e., part of the measurement model calculations. In one embodiment, an additional measurement model, referred to as a vehicle measurement model, is utilized. For example, in one embodiment a pseudo measurement vector of possible street assignments that varies by particle location and can be denoted $s_t^{(k)} = [s_{t,1}^{(k)}, \ldots, s_{t,Mt}^{(k)}]$ for the kth particle. Although not a measurement in the usual sense, this is referred to as the road matching prior and is utilized to further determine the likely position of a particle based on the assumption that a vehicle must be located on a street. In this embodiment, the measurement model then becomes, in terms of likelihoods for particle $x_t^{(k)}$, $$p(y_t, z_t, s_t^{(k)} | x_t^{(k)}) = p(s_t^{(k)} | x_t^{(k)}) p(y_t | x_t^{(k)}) \prod_n p(z_{t,n} | x_t^{(k)}) \quad (47)$$

where independence of the observations given the current state is assumed. However, the road matching prior is not factored into the product of its components. Instead, the conditional probability associated with each particle is selected based on a maximum over individual assignment likelihoods such that each particle is assigned a "best explanation".

$$p(s_t^{(k)} | x_t^{(k)}) = \max\{\max_i p(s_{t,i}^{(k)} | x_t^{(k)}), \epsilon\} \quad (48)$$

In other embodiments, rather than utilize a maximum value, the values may be summed to determine the most likely location.

Additional modifications may be made to the vehicular measurement model to handle particular issues, such as lane level detection (as opposed to just street level detection) and efficiently determining street assignments even when located near problem spots like intersections. In one embodiment, road segments are defined as polygons that overlap (at intersections), resulting in particles that may be associated with a plurality of different streets. For a given particle $x^{(k)}_t$, a list of street assignments may be retrieved using standard geometric indexing and testing techniques. For example, in one embodiment street polygons created via their centerline and width—are indexed in a R tree by their bounding rectangles. This essentially clusters nearby streets, and clusters of street clusters, etc., into nodes in a tree that can be efficiently traversed to return all street segments whose rectangular envelopes contain $x^{(k)}_t$. Each candidate street polygon can then be tested to see if it actually contains the particle.

However, one potential drawback of this arrangement is that more than one street assignment may be assigned when the vehicle is located at an intersection. In another embodiment, a minimum likelihood value $\in$ is also utilized to prevent road matching included in the vehicle motion model to prevent the road matching element $s_t^{(k)}$ from becoming too influential as compared with other measurements. In still other embodiments, rather than classify a vehicle as located on a particular street or not, determinations are made regarding the particular lane on which the vehicle is located.

Part of determining the viability of a street or road assignment for a specific vehicle particle, is accounting for the fact that both the position and velocity are constrained for vehicles driving on networks. In one embodiment, a simple model is utilized that ignores turn rate, relying instead on the particle's position and velocity components, denoted $r_{t(k)}$ and $\dot{r}_t^{(k)}$.

$$p(s_{t,i}^{(k)} \mid x_t^{(k)}) = \frac{1}{C} f_{pos}(s_{t,i}^{(k)} \mid r_t^{(k)}) f_{vel}(s_{t,i}^{(k)} \mid r_t^{(k)}) \quad (49)$$

Here C a normalization constant such that $\Sigma p(s_{t,i}^{(k)} \mid x_t^{(k)}) = 1$, i.e., so that particle likelihoods are valid probability mass functions (PMFs) over street assignments.

The position likelihood of a car represents the likelihood that a car is driving on a particular street or road, and is a function of the car's proximity to that street. The position likelihood can therefore be defined as a function of the distance to the street centerline $l(s_{t,i}^{(k)})$ $$f_{pos}(s_{t,i}^{(k)} \mid r_t^{(k)}) = f\left(\frac{\|r_t^{(k)} - l(s_{t,i}^{(k)})\|}{\lambda(s_{t,i}^{(k)})}\right) \quad (50)$$

Where $\lambda(\cdot)$ maps to the street width. An example choice for the function $f$ is the smoothly decaying $f(\alpha) \propto \exp(-\alpha^2/2)$. Alternatives include although exponential $f(\alpha) \propto \exp(-\alpha)$ and flat on-or-off-road functions $f(\alpha) \propto I_{[0,1]}\alpha)$ where $I(\cdot)$ is the indicator function.

While streets can be classified as one-way or two-way, sometimes vehicles move parallel to its axis. To account for this the velocities on a particular street are represented as coming from a soft distribution only focused along the major driving modes for the street. In one embodiment, a simple Gaussian mixture (GM) model $$f_{vel}(s_{t,i}^{(k)} \mid \dot{r}_t^{(k)}) = w_F N(\dot{r}_t^{(k)} \mid \mu_F, \Sigma_{F/T}) + w_T N(\dot{r}_t^{(k)} \mid -\mu_F, \Sigma_{F/T}) + w_S N(\dot{r}_t^{(k)} \mid 0, \Sigma_S) \quad (51)$$

Where subscripts F, T, and S signify front-to, to-from, and stopped modes (to and from are defined with respect to the endpoints of the street segment). If traffic does not flow in a to-from or from-to direction, then the weights $W_T$ or $w_F$ are set to zero (or a small positive constant to account for those who drive the wrong way down one way streets). In the above expression, it is assumed to and from directions are characterized by identical although flipped parameters, although this does not need to be the case if one is accounting for asymmetric traffic conditions. Although not evident in the simplified notation, $\mu_F$ and $\Sigma_s$ are generally oriented along the street axis and can depend on the street's characteristics (such as speed limit and street type).

At step 1104 the calculated road matching likelihoods are multiplied onto the particle weights to generate an updated posterior set (i.e., particle set). In some embodiments, such as those shown in FIGS. 3 and 4, the PF update operates as normal, and then a road matching update is performed subsequently. In this embodiment, the weights targeting the posterior distribution at time are, for particle k, given by $$w_t^{(k)} \propto \tilde{w}_t^{(k)} p(s_t^{(k)} \mid x_t^{(k)}) \quad (52)$$

wherein $\tilde{w}_t^{(k)}$ is the weight applied after the non-road matching PF update. In the embodiment shown in FIG. 11, the road matched particle set update is provided as an output representing the updated posterior set (i.e., particle set). In addition, the road matched particle set update is utilized as an input at step 1106 to perform output clamping.

In one embodiment, output clamping provided at step 1106 provides a single, summarizing result that conveys the location of the vehicle, the confidence in that location, as well as its speed, bearing, and corresponding street match. In the embodiment shown in FIG. 11, these quantities are determined by processing the particle filter estimated posteriors (i.e., road matched particle set update posterior) to obtain a single "road clamped" point estimate or "clampings". Having calculated a road clamping location at step 1106, a delay is introduced at step 1108, and the current road clamped location becomes the previous road clamped location and is provided in feedback to step 1106. In one embodiment, computing the road matching likelihood includes computing a set of possible clampings at time t as $$S_t = \bigcup_{k,i} s_{t,i}^{(k)} \quad (53)$$

wherein $S_t$ represents the set of all roads on which the user may be located based on the plurality of particles k included in the current posterior estimate, represented as a particle point set. Given the set of possible clamping locations (i.e., streets), a probability associated with each clamping possibility $s_{t,j} \in S_t$ can be determined by aggregating the assignment PMFs from all particles $$p(s_{t,j}) = \sum_k p(s_{t,i}^{(k)} = s_{t,j} \mid x_t^{(k)}) w_t^{(k)} \quad (54)$$

That is, for the plurality of particles included in the particle filter set, a probability is computed for each street (as described by the road network map) regarding how likely it is the user is located on that particular street. For many particles, it is possible that $p(s_{t,i}^{(k)} = s_{t,j} \mid x_t^{(k)}) w_t^{(k)} = 0$, i.e., particle k is not possible on street $s_{t,j}$ (as determined via the initial querying step). In addition, the embodiment described in Equation (54) includes a null hypothesis, defined as the probability of no clamping, or the vehicle being "off-road", because it is possible some particles simply do not fall on any road segments. The off-road probability is computed as $$p(\bar{s}_t) = 1 - \sum_j p(s_{t,j}) \quad (55)$$

The point estimate for the jth road clamping, denoted $\tilde{x}_{t,j}$ can be taken as, for example, mean projected particles defined as $$\hat{x}_{t,j} = \sum_k p(s_{t,i}^{(k)} = s_{t,j} \mid x_t^{(k)}) w_t^{(k)} proj_{s_{t,j}}(x_t^{(k)}) \quad (56)$$

where $proj(\cdot)$ projects the particle onto the street segment (both position and velocity are projected). However, it is possible to perform mode finding on the intermediate (projected) particle distribution and report either the modes (and their probabilities) or just the maximum. For the null hypothesis, one can simply calculate the standard MMSE or MAP point estimate, as in the generic PF framework.

Assuming a single reported estimate per clamping, it is possible to just return the maximum likelihood (ML) clamping result, defined as $$C_{t,j^*} = (s_{t,j^*}, \hat{x}_{t,j^*}, p(s_{t,j^*}), \sigma_{t,j^*}), \quad j^* = \arg\max_j p(s_{t,j}) \quad (57)$$

where $\tau_{t,j}^*$ is radius of the horizontal circle around $\hat{x}_{t,j}^*$ that captures 68% of the particle mass (our standard uncertainty metric). In other embodiments, one can use knowledge of the road network and information from the previous PF iteration to potentially improve results. For example, in one embodiment a set of clamping results $\{C_{t,|j}\}_j$ is maintained at each PF iteration, allowing transition probabilities $p(C_{t,j}|C_{t-1,i})$ over pairs (i, j) to be computed using for instance the distances between their point estimates over the road network. The overall clamping probabilities can be expressed as $$p(s_{t,j}) \leftarrow p(s_{t,j}) \sum_i p(C_{t,j} | C_{t-1,i}) \qquad (58)$$

and the modified ML solution can be reported. In this way, "spurious" clampings are filtered that disagree strongly with previous ones (are far away, in terms of road-network distance), which can happen somewhat often in dense urban areas characterized by severe GPS errors.

As described earlier, one means of accomplishing this is by using a simple function (e.g., Gaussian) weighting the road network distances. Other possibilities include considering velocities corresponding to current and previous clampings in addition to locations, as well as feeding back previous clamping results into the road matching step itself.

Figure 12:
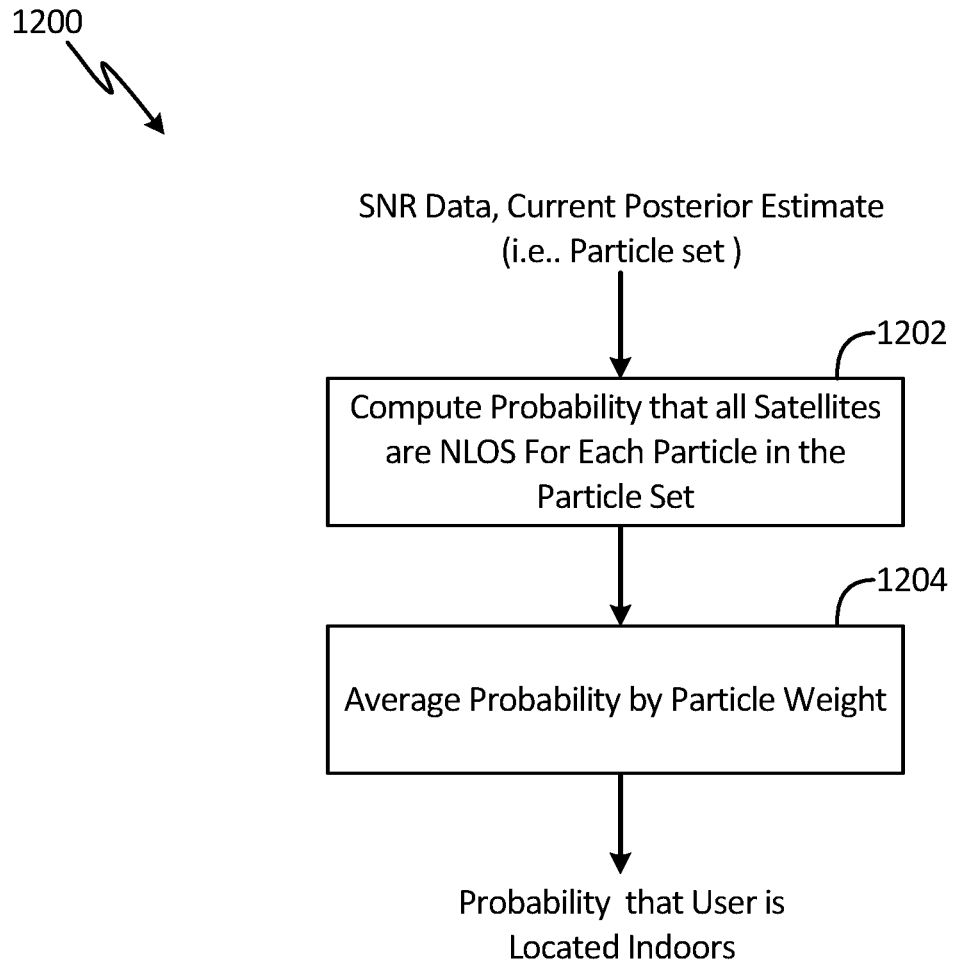
FIG. 12 is a flowchart that illustrates steps performed by the localization server to determine the likelihood that a user is located indoors according to an embodiment of the present invention.

FIG. 12 is a flowchart that illustrates steps performed by the localization server to determine the likelihood that a user is located indoors according to an embodiment of the present invention. As discussed above with respect to FIGS. 3 and 4, determining the probability of a user being indoors is an optional feature that may be included in embodiments of the present invention. Benefit of determining whether a user is indoors include providing confirmation to the user of the user location, suspending additional calculations until a LOS signal is located, and/or as an input to other applications utilizing the user's location.

In the embodiment shown in FIG. 12, inputs received include the current particle set (i.e., labeled "Output Particle Set Estimate (this update" in FIG. 4), and shadow matching/SNR model. At step 1202, for each particle in the particle set, a probability is calculated that all satellites are NLOS. In one embodiment, having already calculated shadow matching probabilities as part of the shadow matching particle weight update, these values can be re-utilized in determining whether the user device is located indoors without requiring calculations to be performed again. In the embodiment shown in FIG. 12, the probability of all satellites being NLOS can be estimated using Mote Carlo integration over the (estimate) of the posterior.

$$p(I_t | z_{1:t}, y_{1:t}) = \int p(x_t | y_{1:t}, z_{1:t}) p(I_t | x_t, y_{1:t}, z_{1:t}) dx_t \qquad (59)$$

$$\approx \sum_{k=1}^{K} w_t^{(k)} p(I_t | x_t^{(k)}, y_{1:t}, z_{1:t})$$

$$= \sum_{k=1}^{K} w_t^{(k)} \prod_{n=1}^{N_t} p(NLOS_{t,n} | x_t^{(k)}, z_{t,n})$$

wherein the individual NLOS ray probability are computed using the LOS/NLOS odd ratios.

Having already calculated the LOS and NLOS likelihoods, $f_{los}$ and $f_{nlos}$, respectively, as part of the shadow matching particle weight updates (step 308 in FIG. 3, or step 406 in FIG. 4) particle blockage probabilities $\{P_{t,n,k}\}_{n,k}$, may be determined either via ray-tracking between each particle-satellite pairing (full shadow matching) or via a lightweight shadow matching technique that does not require 3D ray tracking. In this embodiment, the event labeled describes the condition in which the user transitions indoors or is located indoors.

At step 1204, the probability is averaged based on particle weight to determine the likelihood that a user is indoors. In one embodiment, given current and past measurements (i.e., SNR measurements), the probability of being indoors may be expressed as $$p(NLOS_{t,n} | x_t^{(k)}, z_{t,n}) = \frac{1}{1 + \frac{f_{los}(z_{t,n})}{f_{nlos}(z_{t,n})} \frac{1-P_{t,n,k}}{P_{t,n,k}}} \qquad (60)$$

In other embodiments, additional processing may be utilized such as filtering and thresholding (e.g., to detect outdoor to indoor transitions and vice versa). This information can similarly be paired/integrated with additional information such as residence locations for semantic localization. The calculated probability that the user is located indoors may be provided to the user device itself, or may be utilized as an input to the particle filter to temporarily halt calculations of user locations based on the likelihood that all satellites are NLOS.

In this way, the present disclosure provides a system and method of improving position estimates of global navigation satellite systems (GNSS). The improvements are particularly significant in urban areas where GNSS position fixes could become inaccurate due to LOS blockage and multipath propagation. The methods describe include a plurality of methods that may be utilized either alone or in conjunction with other methods. For example, the method of expanding uncertainty associated with GNSS fix positions may be utilized in the bootstrap PF (shown in FIG. 3) or the advanced PF (shown in FIG. 4), and may in turn rely on the de-correlation model of expanding uncertainty, the adaptive outlier model, or a combination thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A method of determining location of a user device includes receiving global navigation satellite system (GNSS) fix data that represents GNSS calculated position of the user device, receiving signal strength data associated with each satellite communicating with the user device, and receiving map information regarding environment surrounding the user device. The received GNSS fix data and signal strength data is provided to a non-linear filter, wherein the non-linear filter fuses the GNSS fix data and signal strength data to generate an updated position estimate of the user device. The non-linear filter utilizes probabilistic shadow matching estimates that represent a likelihood of received signal strength data as a function of hypothesized user device locations within the environment described by the received map information.

The method of the preceding paragraph can optionally include, additionally and/or alternatively any, one or more of the following features, configurations and/or additional components.

The method may further include wherein the probabilistic shadow matching applies a signal-to-noise ratio (SNR) model to received signal strength data to determine a probability of whether the received signal is line-of-sight (LOS) or non-line-of-sight (NLOS), and further utilizes the map information to determine a probability of a signal received from each satellite being blocked, wherein the LOS/NLOS probability and blockage probability are combined to generate the probabilistic shadow matching estimate.

The method may further include wherein the map information includes a 3D occupancy map, wherein the blockage probability is calculated utilizing ray-tracing between hypothesized user device locations and each satellite.

The method may further include wherein the map information regarding the environment includes information regarding street locations and coarse building height statistics, wherein the blockage probability is calculated utilizing street assignments for each hypothesized user device location and coarse building height statistics.

The method may further include wherein the map information regarding the environment includes at least one of 2D maps, road network maps, statistical information on building heights, 2.5D map based on building footprints.

The method may further include wherein the non-linear filter utilizes a motion model to predict user device locations in a subsequent time step, wherein the predicted user device locations are provided in feedback to be fused with current GNSS fix data and signal strength data.

The method may further include generating a likelihood surface based on the GNNS position fix measurement and the predicted user device locations generated by the motion model, wherein the likelihood surface defines the hypothesized user device locations.

The method may further include wherein the likelihood surface is generated using kernelized estimates with kernel centers selected as a union ellipses around the GNSS position fix and predicted user device locations generated by the motion model.

In another embodiment, a method of determining location of a user device, the method comprises receiving global navigation satellite system (GNSS) fix data that represents GNSS calculated position of the user device, receiving signal strength data associated with each satellite communicating with the user device, and receiving map information associated with a surrounding environment. The method further includes generating a predicted particle set based on predicted particle locations generated by a motion model, and generating a likelihood surface based on received GNSS fix data and the predicted particle set. Particle weights are calculated for particles included in the likelihood surface based on received GNSS fix data and received signal strength data to generate a weighted likelihood surface, and a location estimate is generated based on the calculated particle weights.

The method of the preceding paragraph can optionally include, additionally and/or alternatively any, one or more of the following features, configurations and/or additional components.

The method may further include wherein generating the likelihood surface includes using kernelized estimates with kernel centers selected as a union ellipses around the GNSS position fix and predicted user device locations generated by the motion model.

The method may further include re-sampling particles from the predicted particle set generated by the motion model and the weighted likelihood surface to generate an optimally sampled particle set.

The method may further include resetting particles included in the weighted likelihood surface to include particle positions located outside of those predicted by the motion model.

The method may further include wherein calculating particle weights for particles included in the likelihood surface includes applying a shadow matching model to generate particles weights that represent a likelihood of received signal strength data as a function of particle location and the received map information.

The method may further include wherein applying the shadow matching model includes utilizing the received signal strength data to determine a probability of whether the received signal is line-of-sight (LOS) or non-line-of-sight (NLOS), and further includes utilizing the map information to determine a probability of a signal received from each satellite being blocked, wherein the LOS/NLOS probability and blockage probability are combined to generate the particle weights.

The method may further include wherein the map information includes a 3D occupancy map, wherein the blockage probability is calculated utilizing ray-tracing between hypothesized user device locations and each satellite.

The method may further include wherein the map information regarding the environment includes information regarding street locations and coarse building height statistics, wherein the blockage probability is calculated utilizing street assignments for each hypothesized user device location and coarse building height statistics.

The method may further include determining a probability that a user is located indoors based on the calculated probability that all received signal strength data are NLOS.

In another embodiment, a method of determining location of a user device, the method includes receiving a plurality of successive global navigation satellite system (GNSS) fix data that represents GNSS calculated position of a user device. The method further includes modifying an uncertainty associated with the GNSS fix data. A predicted particle set is received, wherein the predicted particle set is comprised of a plurality of particles representing hypothesized locations of the user device. The weights associated with the particles are updated using a GNSS fix matching particle weight update, wherein updated weights are given less value if the uncertainty value is higher.

The method of the preceding paragraph can optionally include, additionally and/or alternatively any, one or more of the following features, configurations and/or additional components.

The method may further include wherein the uncertainty is modified in response to received map information providing information regarding an environment surrounding the user device, wherein map information indicating the environment is more built-up results in an increase in the uncertainty.

The method may further include wherein the uncertainty is modified in response a correlation value measured with respect to successive GNSS fixes, wherein uncertainty is increased in response to determined correlation between successive GNSS fixes.

The invention claimed is:

1. A method of determining location of a user device, the method comprising:
receiving global navigation satellite system (GNSS) fix data that represents a GNSS calculated position of the user device;
receiving signal strength data associated with each satellite communicating with the user device;
receiving map information regarding an environment surrounding the user device;
providing the received GNSS fix data, signal strength data, and a sampled particle set generated based on a previous particle set output to a particle filter, wherein the particle filter updates particle weights associated with the previous particle set output by fusing the GNSS fix data and the signal strength data, wherein the particle filter utilizes GNSS fix matching based on the GNSS fix data and probabilistic shadow matching estimates that represent a likelihood of received signal strength data as a function of hypothesized user device locations within the environment described by the received map information to update the particle weights and generate an output particle set estimate;
applying a motion model to the output particle set estimate, wherein the motion model generates a predicted particle set that for each particle location comprises a distribution of possible locations and a distribution of possible velocities in a future time step;
applying Rao-Blackwell sampling to the predicted particle set to generate a sampled particle set, wherein Rao-Blackwell sampling restricts the distribution of possible locations to a point mass, and wherein the sampled particle set is provided in feedback to the particle filter to be updated based on the received GNSS fix data and signal strength data; and
providing a corrected device location output based on the output particle set estimate generated by the particle filter.

2. The method of claim 1, wherein the probabilistic shadow matching applies a signal-to-noise ratio (SNR) model to received signal strength data to determine a probability of whether the received signal is line-of-sight (LOS) or non-line-of-sight (NLOS), and further includes utilizing the map information to determine a probability of a signal received from each satellite being blocked, wherein the LOS/NLOS probability and blockage probability are combined to generate the probabilistic shadow matching estimate.

3. The method of claim 2, wherein the map information includes a 3D occupancy map, wherein the blockage probability is calculated utilizing ray-tracing between hypothesized user device locations and each satellite.

4. The method of claim 2, wherein the map information regarding the environment includes information regarding street locations and coarse building height statistics, wherein the blockage probability is calculated utilizing street assignments for each hypothesized user device location and coarse building height statistics.

5. The method of claim 2, wherein the map information regarding the environment includes at least one of 2D maps, road network maps, statistical information on building heights, and a 2.5D map based on building footprints.

6. The method of claim 1, wherein the non-linear filter utilizes a motion model to predict user device locations in a subsequent time step, wherein the predicted user device locations are provided in feedback to be fused with current GNSS fix data and signal strength data.

7. The method of claim 6, further including:
generating a likelihood surface based on the GNSS position fix measurement and the predicted user device locations generated by the motion model, wherein the likelihood surface defines the hypothesized user device locations.

8. The method of claim 7, wherein the likelihood surface is generated using kernelized estimates with kernel centers selected as an ellipse around the GNSS position fix and ellipses around predicted user device locations generated by the motion model.

9. The method of claim 1, further comprising:
receiving a road network map that identifies the location of roads within an area surrounding the user;
computing road matching likelihoods for particles in the output particle set estimate based on the proximity of each particle to the location of roads identified in the road network map; and
multiplying the computed likelihoods computed for each particle onto the output particle set estimate to modify the weights associated with each particle to generate an updated output particle set estimate.

10. The method of claim 9, further comprising:
assigning particles in the output particle set estimate to one of the roads identified in the road network map to ensure that all particles in the output particle set estimate are assigned to a road location.

11. The method of claim 2, further comprising:
computing a probability that all received signals for each particle in the output particle set is NLOS; and
generating an output indicating whether the user is located indoors based on the computed probability that all received signals for each particle in the output particle set is NLOS.

* * * * *